United States Patent
Lysejko et al.

(10) Patent No.: US 9,560,676 B2
(45) Date of Patent: Jan. 31, 2017

(54) COOPERATIVE COMPONENTS IN A WIRELESS FEEDER NETWORK

(71) Applicant: Airspan Networks Inc., Boca Raton, FL (US)

(72) Inventors: Martin Lysejko, Bagshot (GB); Andrew Logothetis, Buckinghamshire (GB); David Warman, Berkshire (GB)

(73) Assignee: AIRSPAN NETWORKS INC., Boca Raton, FL (US)

( * ) Notice: Subject to any disclaimer, the term of this patent is extended or adjusted under 35 U.S.C. 154(b) by 533 days.

(21) Appl. No.: 13/783,023

(22) Filed: Mar. 1, 2013

(65) Prior Publication Data
US 2013/0242899 A1    Sep. 19, 2013

(30) Foreign Application Priority Data

Mar. 13, 2012   (GB) .................................. 1204369.1

(51) Int. Cl.
*H04W 4/00*        (2009.01)
*H04W 76/00*      (2009.01)
(Continued)

(52) U.S. Cl.
CPC .............. *H04W 76/00* (2013.01); *H04L 1/004* (2013.01); *H04L 5/0035* (2013.01); *H04L 5/0023* (2013.01); *H04L 5/0048* (2013.01)

(58) Field of Classification Search
CPC ............................... H04W 76/00; H04L 1/004
See application file for complete search history.

(56) References Cited

U.S. PATENT DOCUMENTS

2005/0192037 A1*  9/2005  Nanda ................... H04W 74/04
                                                           455/509
2007/0178927 A1*  8/2007  Fernandez-Corbaton
                                                  ........................... H04W 52/367
                                                           455/522
(Continued)

FOREIGN PATENT DOCUMENTS

EP          2434835 A1    3/2012
WO    2007106651 A2    9/2007
WO    2011099907 A1    8/2011

OTHER PUBLICATIONS

Huawei, "HARQ Operation for uplink CoMP," Agenda item 7.5 at 3GPP TSG RAN WG2 Meeting #67, Shenzhen, China, Aug. 2009, paper R2-094790, 6pp.
(Continued)

*Primary Examiner* — Gregory Sefcheck
*Assistant Examiner* — Jael Ulysse
(74) *Attorney, Agent, or Firm* — Haynes Beffel & Wolfeld LLP

(57) ABSTRACT

A wireless feeder network comprises feeder base stations coupled to the communications network and feeder terminals coupled to associated access base stations of the access network. A group of wireless network components form elements of a feeder cluster and the elements of the feeder cluster are connected by an additional communications resource configured to be operated in parallel with the wireless resource of the wireless feeder network. Both a primary and secondary element of the feeder cluster seek to decode at least one resource block allocated to the primary element for reception of data. Information derived from the secondary decoded data is transmitted from the secondary element to the primary element via the additional communications resource. The primary element then performs a revised decoding process additionally using the information
(Continued)

received from said secondary element to improve its own decode probability.

29 Claims, 17 Drawing Sheets

(51) Int. Cl.
*H04L 1/00* (2006.01)
*H04L 5/00* (2006.01)

(56) References Cited

U.S. PATENT DOCUMENTS

| | | | | |
|---|---|---|---|---|
| 2008/0049672 A1* | 2/2008 | Barak | ............ | H04L 5/0023 370/330 |
| 2008/0080364 A1* | 4/2008 | Barak | ............ | H04B 7/0408 370/210 |
| 2008/0090575 A1* | 4/2008 | Barak | ............ | H04W 16/10 455/444 |
| 2008/0198785 A1* | 8/2008 | Huang | ............ | H04W 72/005 370/312 |
| 2008/0205552 A1* | 8/2008 | Sartori | ............ | H04L 1/06 375/316 |
| 2008/0274745 A1* | 11/2008 | Barak | ............ | H04W 16/02 455/447 |
| 2009/0010238 A1* | 1/2009 | Barak | ............ | H04L 25/0226 370/342 |
| 2009/0196366 A1* | 8/2009 | Shen | ............ | H04L 5/0053 375/260 |
| 2009/0232122 A1* | 9/2009 | Suda | ............ | H04B 7/0417 370/345 |
| 2010/0027694 A1* | 2/2010 | Touboul | ............ | H04J 11/0093 375/260 |
| 2010/0302999 A1* | 12/2010 | Hui | ............ | H04B 7/2606 370/315 |
| 2012/0071153 A1* | 3/2012 | Balachandran | ............ | H04J 11/004 455/422.1 |

OTHER PUBLICATIONS

Huawei, "RAN2 considerations for coordinated multipoint transmission and reception," Agenda item 7 at 3GPP TSG-RAN WG2 Meeting #66, San Francisco, May 2009, paper R2-093107, 6pp.
Doll M. et al., "Final conclusions on RAN architecture," ARTIST4G Project, grant 247223, L. Campoy, ed., file ARTIST4G D4_3_v1_0, Jun. 2012, 62 pp.
Apr. 17, 2013 International Search Report in related application PCT/GB2013/050278, 13 pp.
Falconetti, Laëtitia et al.; Distributed Uplink Macro Diversity for Cooperating Base Stations; IEEE 2009; 5 pp.
GB Search Report for corresponding Application No. GB1204369.1; Jul. 4, 2012; 4 pp.

* cited by examiner

UL/DL resource block assignments. Simple orthogonal case.

| | | |
|---|---|---|
| Bandwidth | Hz | 10000000 |
| Fs | Hz | 11200000 |
| FFT size | | 1024 |
| Tone spacing | Hz | 10937.5 |
| Frame length | s | 0.005 |
| Frames / sec | | 200 |
| DC subcarriers | | 1 |
| Guard subcarriers; left | | 92 |
| Guard subcarriers; right | | 91 |
| Used subcarriers (+DC) | | 841 |
| Subchannels | | 30 |
| Clusters per subchannel | | 2 |
| Subcarriers per cluster | | 14 |
| Subcarriers/subchannel | | 28 |
| Data subcarriers/subchannel | | 24 |
| Pilot density | % | 14.29 |
| Symbols / frame | | 24 |
| Normalised data | b/s | 3456000 |
| Number of RX antennas | | 2 |

400

| Qautisation | |
|---|---|
| Raw data | 24 |
| Equalised data | 24 |
| SNR | 16 |
| LLRs | 8 |

405

410

| MCS | MIMO Mode | Decoded Bits | Data Transfer (Mbps) | | |
|---|---|---|---|---|---|
| | | | LLR | Post MMSE | Raw Data |
| QPSK 1/2 | A | 3.46 | 55.30 | 138.24 | 165.89 |
| QPSK 3/4 | A | 5.18 | 55.30 | 138.24 | 165.89 |
| 16QAM 1/2 | A | 6.91 | 110.59 | 138.24 | 165.89 |
| 16QAM 3/4 | A | 10.37 | 110.59 | 138.24 | 165.89 |
| 64QAM 1/2 | A | 10.37 | 165.89 | 138.24 | 165.89 |
| 64QAM 2/3 | A | 13.82 | 165.89 | 138.24 | 165.89 |
| 64QAM 3/4 | A | 15.55 | 165.89 | 138.24 | 165.89 |
| 64QAM 5/6 | A | 17.28 | 165.89 | 138.24 | 165.89 |
| 256QAM 1/2 | A | 13.82 | 221.18 | 138.24 | 165.89 |
| 256QAM 2/3 | A | 18.43 | 221.18 | 138.24 | 165.89 |
| 256QAM 3/4 | A | 20.74 | 221.18 | 138.24 | 165.89 |
| 256QAM 5/6 | A | 23.04 | 221.18 | 138.24 | 165.89 |
| QPSK 1/2 | B | 6.91 | 110.59 | 276.48 | 165.89 |
| QPSK 3/4 | B | 10.37 | 110.59 | 276.48 | 165.89 |
| 16QAM 1/2 | B | 13.82 | 221.18 | 276.48 | 165.89 |
| 16QAM 3/4 | B | 20.74 | 221.18 | 276.48 | 165.89 |
| 64QAM 1/2 | B | 20.74 | 331.78 | 276.48 | 165.89 |
| 64QAM 2/3 | B | 27.65 | 331.78 | 276.48 | 165.89 |
| 64QAM 3/4 | B | 31.10 | 331.78 | 276.48 | 165.89 |
| 64QAM 5/6 | B | 34.56 | 331.78 | 276.48 | 165.89 |
| 256QAM 1/2 | B | 27.65 | 442.37 | 276.48 | 165.89 |
| 256QAM 2/3 | B | 36.86 | 442.37 | 276.48 | 165.89 |
| 256QAM 3/4 | B | 41.47 | 442.37 | 276.48 | 165.89 |
| 256QAM 5/6 | B | 46.08 | 442.37 | 276.48 | 165.89 |

FIG. 6

| | | | MCS | MIMO Mode | Decoded Bits | Data Transfer (Mbps) | | |
|---|---|---|---|---|---|---|---|---|
| | | | | | | LLR | Post MMSE | Raw Data |
| Bandwidth | Hz | 10000000 | QPSK 1/2 | A | 3.46 | 27.65 | 110.59 | 165.89 |
| Fs | Hz | 11200000 | QPSK 3/4 | A | 5.18 | 27.65 | 110.59 | 165.89 |
| FFT size | | 1024 | 16QAM 1/2 | A | 6.91 | 55.30 | 110.59 | 165.89 |
| Tone spacing | Hz | 10937.5 | 16QAM 3/4 | A | 10.37 | 55.30 | 110.59 | 165.89 |
| Frame length | s | 0.005 | 64QAM 1/2 | A | 10.37 | 82.94 | 110.59 | 165.89 |
| Frames / sec | | 200 | 64QAM 2/3 | A | 13.82 | 82.94 | 110.59 | 165.89 |
| DC subcarriers | | 1 | 64QAM 3/4 | A | 15.55 | 82.94 | 110.59 | 165.89 |
| Guard subcarriers; left | | 92 | 64QAM 5/6 | A | 17.28 | 110.59 | 110.59 | 165.89 |
| Guard subcarriers; right | | 91 | 256QAM 1/2 | A | 13.82 | 110.59 | 110.59 | 165.89 |
| Used subcarriers (+DC) | | 841 | 256QAM 2/3 | A | 18.43 | 110.59 | 110.59 | 165.89 |
| Subchannels | | 30 | 256QAM 3/4 | A | 20.74 | 110.59 | 110.59 | 165.89 |
| Clusters per subchannel | | 2 | 256QAM 5/6 | A | 23.04 | 110.59 | 110.59 | 165.89 |
| Subcarriers per cluster | | 14 | QPSK 1/2 | B | 6.91 | 55.30 | 221.18 | 165.89 |
| Subcarriers/subchannel | | 28 | QPSK 3/4 | B | 10.37 | 55.30 | 221.18 | 165.89 |
| Data subcarriers/subchannel | | 24 | 16QAM 1/2 | B | 13.82 | 110.59 | 221.18 | 165.89 |
| Pilot density | % | 14.29 | 16QAM 3/4 | B | 20.74 | 110.59 | 221.18 | 165.89 |
| Symbols / frame | | 24 | 64QAM 1/2 | B | 20.74 | 165.89 | 221.18 | 165.89 |
| Normalised data | b/s | 3456000 | 64QAM 2/3 | B | 27.65 | 165.89 | 221.18 | 165.89 |
| Number of RX antennas | | 2 | 64QAM 3/4 | B | 31.10 | 165.89 | 221.18 | 165.89 |
| | | | 64QAM 5/6 | B | 34.56 | 221.18 | 221.18 | 165.89 |
| Qautisation | | | 256QAM 1/2 | B | 27.65 | 221.18 | 221.18 | 165.89 |
| Raw data | 24 | | 256QAM 2/3 | B | 36.86 | 221.18 | 221.18 | 165.89 |
| Equalised data | 24 | | 256QAM 3/4 | B | 41.47 | 221.18 | 221.18 | 165.89 |
| SNR | 8 | | 256QAM 5/6 | B | 46.08 | 221.18 | 221.18 | 165.89 |
| LLRs | 4 | | | | | | | |

FIG. 7

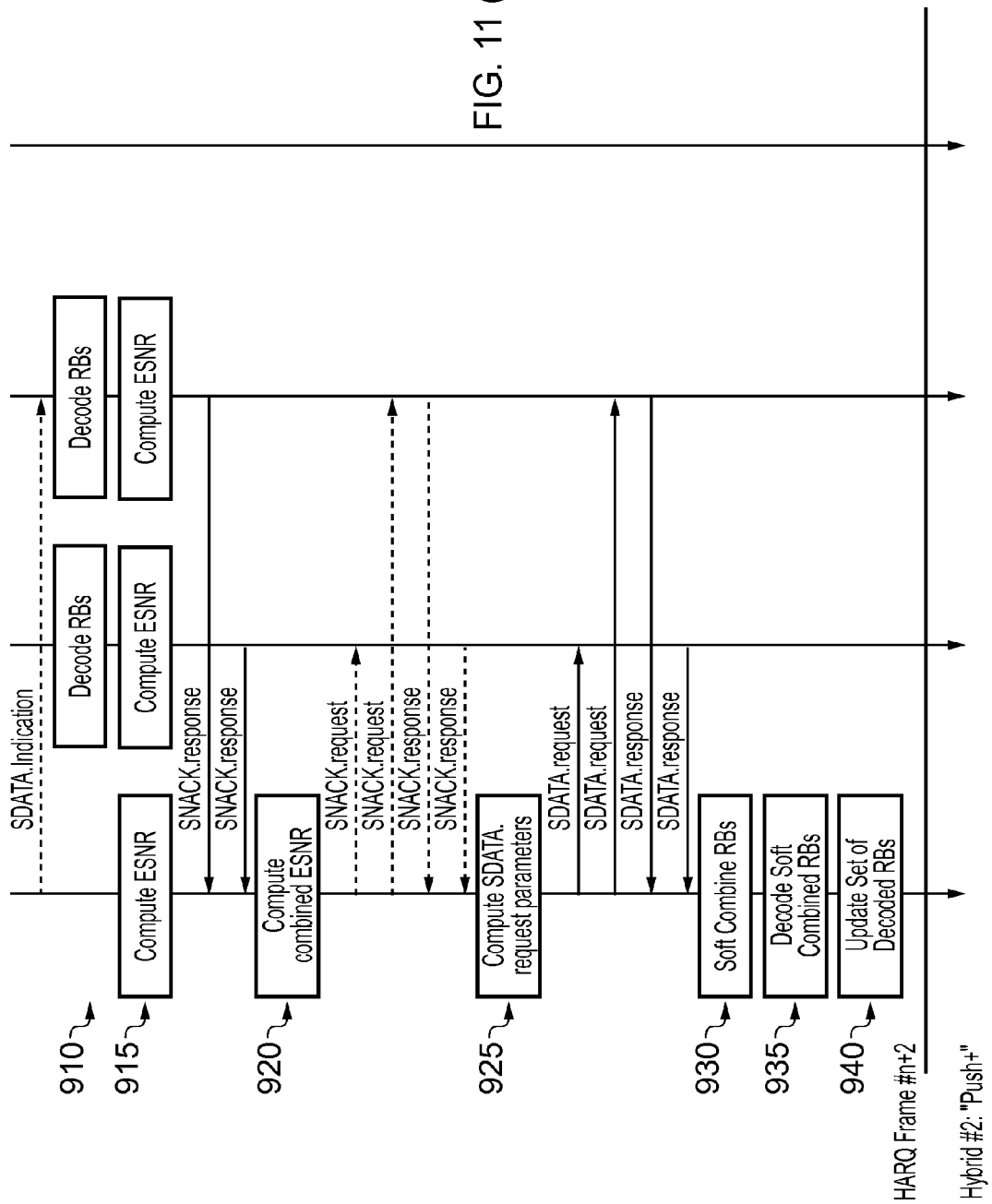

Updated visibility matrix post initial sounding

COOPERATIVE COMPONENTS IN A WIRELESS FEEDER NETWORK

BACKGROUND OF THE INVENTION

Field of the Invention

The present invention relates to a method for controlling a wireless feeder network used to couple access base stations of an access network with a communications network and to various components within such a wireless feeder network.

Description of the Prior Art

Various types of access network which provide a wireless link between end user equipment and a communications network are known, for example using standards such as WiFi, WiMAX, or LTE. The wireless links are formed between the end user equipment and access base stations which provide the connection between the access network and the communications network.

Whilst the access base stations could be coupled to the communications network via fixed, wired connections (a wired "backhaul" connection) it is known that a greater degree of flexibility with regard to the placement and configuration of the access base stations is possible if the connection between the access base stations and the communications network is provided by a dedicated wireless backhaul connection. Yet although such a wireless backhaul solution may provide a connection which is more easily deployed, it instead faces significant challenges with regard to the appropriate use of the scarce radio frequencies which must be allocated in advance to the wireless backhaul connection (as opposed to the frequencies allocated for the access network).

Due to the scarcity of the radio frequencies available for providing this wireless backhaul connection, various techniques have been developed to improve the throughput of such a connection. For example, techniques such as Automatic Repeat Request (ARQ), Hybrid ARQ (HARQ), HARQ with soft combining and so on have been developed to improve the reliability with which data may be transmitted via such a connection. However, although such techniques generally can provide a significant improvement in the data throughput by means of their error detection and correction capabilities, these techniques require a re-transmission of data via the wireless connection if the error correction/detection provided is insufficient to decode that data. Such a retransmission must be scheduled amongst the ongoing data being transmitted via the wireless connection, and will require its own handshake protocols to ensure positive reception of the retransmitted PDU (protocol data unit), all resulting in additional undesirable latency.

An alternative approach to improving the data reception rate of a receiver is given by beam-forming techniques according to which closely located wireless receivers are provided with a wired connection allowing a weighted antenna beam shape to be generated and to improve the wireless throughput of an individual antenna by means of additional contributions from the neighbouring antenna to which it is coupled. However, such beam-forming techniques generally require a large bandwidth wired connection to be provided between the antenna and lack flexibility in the context of a generic wireless connection to be provided between access base stations and a communications network such that it is easily deployed and reconfigured.

Accordingly, it would be desirable to provide an improved technique for coupling access base stations of an access network with a communications network, which allows freedom in the placement of base stations of the access network, whilst improving the wireless throughput and avoiding the above mentioned prior art drawbacks.

SUMMARY OF THE INVENTION

Viewed from a first aspect, the present invention provides a method of operating a wireless feeder network used to couple access base stations of an access network with a communications network, the wireless feeder network comprising a plurality of wireless feeder network components, the plurality of wireless feeder network components comprising a plurality of feeder base stations coupled to the communications network and a plurality of feeder terminals coupled to associated access base stations, each feeder terminal having a feeder link with a feeder base station, and the feeder links being established over a wireless resource comprising a plurality of resource blocks, the method comprising the steps of: grouping a plurality of said wireless network components together as elements of a feeder cluster, said elements comprising a primary element and a secondary element; providing connections between said elements of said feeder cluster, wherein said connections are mediated by an additional communications resource configured to be operated in parallel with said wireless resource; in said primary element of said feeder cluster, receiving data transmitted via said wireless resource and performing a primary decoding process to seek to decode at least one resource block allocated for reception of data by said primary element and thereby generate primary decoded data; in said secondary element of said feeder cluster, receiving said data transmitted via said wireless resource and performing a secondary decoding process to seek to decode said at least one resource block allocated for reception of data by said primary element and thereby generate secondary decoded data; transmitting information derived from said secondary decoded data from said secondary element to said primary element via said additional communications resource; and in said primary element of said feeder cluster, performing a revised primary decoding process additionally using said information derived from said secondary decoded data received from said secondary element to decode more reliably said at least one resource block allocated for reception of data by said primary element.

In accordance with the present invention, a method is provided for operating a wireless feeder network. The wireless feeder network comprises a plurality of wireless feeder network components for connecting network users to a communications network. These components comprise a plurality of feeder base stations coupled to the communications network and a plurality of feeder terminals connected to the access base stations to which the network users are connected. Each feeder terminal has a feeder link with a feeder base station and these feeder links are established over a wireless resource comprising a plurality of resource blocks.

The resource blocks form a plurality of orthogonal resources which can be used to provide the feeder links. The orthogonal resources can be provided in various ways. For example, in accordance with a "Time Division Multiple Access" (TDMA) approach, a particular frequency channel of the wireless resource can be partitioned in the time domain such as each resource block occupies a different time slot. As another example, in a "Frequency Division Multiple Access" FDMA approach, a band of frequencies may be partitioned, such that each individual frequency forms a resource block. In a combined TDMA/FDMA approach, a combination of selected time and frequency slots can be used to define each resource block. As another example, in a "Code Division Multiple Access" (CDMA) approach, a particular frequency channel may be partitioned by applying a different orthogonal code to thereby establish resource blocks within the frequency channel. However, the wireless resource is allocated amongst the plurality of resource blocks which are used to establish the feeder links, it is recognised that the data transmitted via any given feeder link may not always be reliably received by its intended recipient. To address this, the present technique first groups a plurality of the wireless network components together as elements of a feeder cluster. The elements of a feeder cluster are wireless network components of a same type, i.e. the feeder cluster could be formed by a number of feeder base stations or could be formed by a number of feeder terminals. Amongst the elements of a given feeder cluster, for the purposes of describing the present technique, one of the elements is labelled the "primary" element and another of the elements is labelled a "secondary" element. Generally speaking in a given feeder cluster one element will be the primary element while the remainder are secondary elements, although it is not necessary for all further elements in the cluster to be denoted as secondary elements.

The elements of the feeder cluster are connected together by an additional communications resource configured to be operated in parallel with the wireless resource. In other words, this additional communications resource provides a separate "channel" by which the elements of the feeder cluster can communicate with one another without conflict with the wireless resource.

The primary element of the feeder cluster receives data transmitted to it via the wireless resource and performs a primary decoding process to attempt to decode at least one resource block allocated to it for reception of data. A secondary element of the feeder cluster also receives data transmitted via the wireless resource and performs a second decoding process to attempt to decode at least one resource block allocated to the primary element for its data reception. The secondary decoded data resulting from the secondary decoding process in the secondary element of the feeder cluster provides information which is then transmitted from the secondary element to the primary element via the additional communications resource. The primary element in the feeder cluster then performs a revised primary decoding process making additional use of the information received via the additional communications resource from the secondary element of the feeder cluster to seek to decode more reliably the at least one resource block allocated for reception of data by the primary element. Accordingly, the wireless feeder network may be arranged in a flexible, ad hoc manner, whereby once the components of the wireless feeder network are defined, cooperative clusters of network components are formed in which (at least one) secondary element also performs a decoding process on a resource block allocated to a primary element in that feeder cluster and transmits information derived therefrom to the primary element via the additional communications resource such that the primary element can perform a revised decoding process to more reliably decode that resource block. Hence, by passing this cooperative information between the elements of the feeder cluster by means of the additional communications resource which is separate from the wireless resource, there is no impact on the usage of the wireless resource for regular data transmission and the latency associated with the retransmission requests is reduced.

The additional communications resource could be provided in a variety of ways (so long as it may be operated in parallel with the wireless resource which provides the plurality of resource blocks), but in one embodiment the additional communications resource is a wired communications resource. In the light of the general move towards wireless technologies, the provision of the additional communications resource as a wired communication resource can be seen to go against this trend. However, the inventors of the present invention have advantageously found that the wired connection by which the elements of the feeder cluster can exchange this "cooperative" information has benefits, for example in terms of latency, over known retransmission request technologies, as well as improving the throughput of the wireless resource because retransmission requests are reduced. Furthermore the bandwidth required to be supported by such an additional communications resource may be kept within reasonable limits if steps are taken to reduce the data rates associated with the communication of information from the secondary elements to the primary element, as will be discussed in more detail below.

As mentioned above, in some embodiments said plurality of said wireless network components grouped together as elements of said feeder cluster are feeder terminals, whilst in other embodiments said plurality of said wireless network components grouped together as elements of said feeder cluster are feeder base stations.

In some embodiments said wireless feeder network further comprises a feeder network controller, said feeder network controller configured to administer said grouping step. A feeder network controller may be provided to administer a number of aspects of the wireless feeder network's configuration and operation and therefore may be well suited to administering the grouping of wireless network components into one or more feeder clusters. For example, the feeder network controller may, as part of the process of establishing the feeder links, have access to information indicative of the mutual visibility of the wireless feeder networks components and therefore be able to appropriately group the wireless network components into feeder clusters which will most benefit from the present technique.

There are various ways in which a feeder network controller could administer the grouping step but in one embodiment said feeder network controller is configured to administer said grouping step by identifying said secondary element to said primary element. Alternatively or in addition, other embodiments provide that said feeder network controller is configured to administer said grouping step by identifying said primary element to said secondary element.

Whether or not a feeder network controller is present in the wireless feeder network the grouping of wireless network components into a feeder cluster may occur in a more self-organised fashion and in one embodiment said plurality of said wireless network components are configured to perform said grouping step by participating in a mutual discovery process via said additional communications resource. Accordingly, a wireless network component can make use of the addition communications resource (for example a wired connection which has already been set up between the wireless feeder network components as part of their deployment) in order to establish which other wireless network components belong to its own feeder cluster.

It should be recognised that the labelling of particular wireless feeder network components as "primary" and "secondary" merely represents the particular roles that these components are playing at a particular moment in time and viewed from a particular aspect. Whilst the relationship between particular wireless feeder network components could in principal be asymmetric (i.e. the cooperative information is only passed in one direction), in some embodiments each element of said feeder cluster is configured to act as said primary element with respect to resource blocks allocated for reception of data by that element, and each element of said feeder cluster is configured to act as said secondary element with respect to resource blocks allocated for reception of data by other elements of said feeder cluster. According to such embodiments, each network component seeks to decode data received using resource blocks allocated to it for data reception and also performs secondary decoding to provide this supporting decode function to another component of the feeder cluster (acting as a secondary element).

The decoding process of data transmitted via a given resource block may take place in a sequence of decoding stages (wherein the output of one stage forms the input of the next stage) and in some embodiments said secondary decoding process comprises a linked sequence of decoding stages and said information derived from said secondary decoded data transmitted from said secondary element to said primary element via said additional communications resource comprises decoded data from a selected decoding stage. Accordingly, the secondary element can provide a selected level of decoded information to the primary element in dependence either on the requirements of the primary element or on the ability of the secondary element to provide reliable data at that selected decoding stage. Such decoding stages may for example comprise a fast fourier transform (FFT) stage, an equalisation stage, a demodulation stage and a final error correction stage.

In order to be able to provide decoded data from any selected stage of the linked sequence of the decoding stages the secondary element may store said decoded data from each stage of said linked sequence of decoding stages. This stored data can for example be held in circular buffers such that data for a fixed number of preceding frames can be accessed.

In some embodiments said decoded data transmitted from said secondary element to said primary element via said additional communications resource is compressed by a compression process. Compressing the decoded data reduces the bandwidth required for its transmission. This compression may take a number of forms but in embodiments may comprise a decimation of said decoded data and/or a quantisation of said decoded data.

Whilst in some embodiments the information derived from the secondary decoded data may be transmitted by the secondary element to the primary element unsolicited, some embodiments comprise the further step, performed after performance of said primary decoding process of: transmitting a data request to said secondary element from said primary element via said additional communications resource, said secondary element transmitting said information derived from said secondary decoded data in response to said data request. Accordingly, the primary element may determine, after performing the primary decoding process, that it is unable to reliably decode the data transmitted to it and accordingly transmits a data request to the secondary element which in response transmits the information derived from the secondary decoded data.

In some embodiments said secondary element performs said secondary decoding process in response to said data request. Accordingly, the secondary decoding process is only performed once such a data request is received. Alternatively, in another embodiment said secondary element performs said secondary decoding process prior to receiving said data request from said primary element. Accordingly, the secondary element may perform the secondary decoding process in anticipation of (or at least in preparation for) a data request from the primary element. Performing the secondary decoding process in advance in this manner can reduce the latency associated with issuing a data request and receiving the requested data.

In addition, such a data request may specify the selected decoding stage when the secondary decoding process comprises a linked sequence of decoding stages. The data request may also specify a type (e.g. decimation or quantisation) and a level (i.e the extent of) the compression process applied to the selected decoding stage output.

In some embodiments the method may comprise the further step performed after performing said revised primary decoding process if said at least one resource block allocated for reception of data by said primary element has not yet been successfully decoded, of: transmitting a further data request to said secondary element from said primary element, said further data request requesting further information derived from said secondary decoded data. Accordingly, the primary element can seek to decode the data transmitted using the at least one resource block in an iterative fashion wherein further data requests to the secondary element are transmitted if the at least one resource block has still not yet been successfully decoded. Such further data requests may simply seek to receive the same further information again or may perform part of an incremental series of requests for more detailed information. For example, in one embodiment said further information derived from said secondary decoded data comprises more detailed data than requested in said data request. For example, an initial data request might only request that a rather heavily quantised version of the secondary decoded data is sent from the secondary element, but if this proves insufficient information to allow the primary element to perform the full decode then a further data request may require that a more detailed (less quantised) version of the data is sent.

Whilst, as mentioned above, the secondary element could be requested to transmit information to the primary element, in one embodiment said secondary element performs said secondary decoding process and transmits said information derived from said secondary decoded data to said primary element unsolicited by said primary element. Such unsolicited transmission of information can be advantageous for example in terms of latency since the delay associated with request and response is avoided. Furthermore, in dependence on the information that the secondary decoding process generates, the secondary element of the feeder cluster may be able to determine that it would be particularly beneficial to transmit this information to the primary element, for example, when the secondary element can achieve a particularly high signal-to-noise ratio for the signal which the primary element is seeking to decode.

There are a number of ways in which a secondary element could determine that particular information should be transmitted unsolicited to a particular primary element but in one embodiment, said secondary element performs said secondary decoding process and transmits said information derived from said secondary decoded data to said primary element in dependence on a resource block usage schedule associated with said primary element. The allocation of the resource blocks of the wireless resource to the feeder links which should be established (for example under the administration of a feeder network controller) can provide the wireless feeder network components with the necessary information to determine which resource blocks are currently associated with which other network components and accordingly within a feeder cluster the network components within that feeder cluster can determine with reference to a resource block schedule which resource blocks the other elements of the feeder cluster are currently seeking to decode.

In one embodiment said secondary element selectively transmits said information derived from said secondary decoded data to said primary element in dependence on at least one predetermined rule. The definition of this at least one predetermined rule can vary greatly, but in essence this rule provides a filter such that not all information derived from the secondary decoded data is passed on to the relevant primary element, but only particular information is sent to particular primary elements under particular conditions. The appropriate definition of such rules therefore can arrange that primary elements only receive that information which will be of most benefit to them and furthermore that the bandwidth available on the additional communications resource is not swamped by the transfer of all possible information from secondary elements to primary elements.

Many different predetermined rules can be envisaged, but in one embodiment said at least one predetermined rule specifies said selected decoding stage. In another embodiment said at least one predetermined rule specifies at least one of a decimation level and a quantisation level. In another embodiment, said at least one predetermined rule comprises at least one of: a signal-to-noise ratio dependency; a modulation and coding scheme dependency; and a multiple-input multiple-output mode dependency.

The at least one predetermined rule may be resource block dependent and/or primary element dependent, in other words can vary from resource block to resource block and/or from primary element to primary element.

The predetermined rules according to which the secondary elements transmit information to the primary elements may come from a number of sources, for example in one embodiment the rules for the secondary elements are determined by the primary elements with which they are in cooperative communication. This provides a distributed (i.e. central control independent) rules-based decision-making information exchange mechanism, in which the rules are established at the "local" level by primary elements for the secondary elements which are cooperating with them. However in another embodiment in which a feeder network controller administers the wireless feeder network, said feeder network controller provides said secondary element with said at least one predetermined rule. Accordingly a more centralised approach to the determination of the rules may be taken, wherein a feeder network controller (or similar central controller) administers the rules for all elements.

In one embodiment said secondary element selectively transmits said information derived from said secondary decoded data to said primary element in dependence on a plurality of predetermined rules, and said secondary element is configured to select said decoded data for transmission to said primary element in accordance with the rule which results in a minimum size of said information derived from said secondary decoded data. This approach reduces the bandwidth requirement imposed on the additional communications resource by the transmission of information from the secondary elements to the primary elements. By configuring the secondary element to operate in this manner a self-minimising approach to this bandwidth issue is provided.

The benefit for the primary element of receiving additional information from a secondary element in the feeder cluster will depend on the relative quality of that additional information in particular in the context of the information that has been found to be lacking as result of the primary decoding process. Accordingly, in one embodiment the method comprises the further steps performed in said secondary element of said feeder cluster after performing said secondary decoding process, of: determining decode quality information indicative of said secondary element's ability to decode said at least one resource block; and transmitting said decode quality information from said secondary element to said primary element via said additional communications resource. Hence the primary element receives decode quality information from the secondary element which allows the primary element to determine how useful any further information which could be derived from the secondary decoded data would be to the primary element in order to fully decode the at least one resource block.

The decode quality information could take a number of forms, but in one embodiment said decode quality information comprises signal-to-noise ratio information. This signal-to-noise ratio information could be a scalar value or could be provided in more detail with regard to frequency as a frequency-dependent vector of values. These scalars or vectors could be provided per MIMO stream.

In one embodiment said decode quality information comprises an indication of decoding success. Accordingly, if it happens that the secondary element is able to fully decode the data transmitted using at least one resource block then the indication of this fact to the primary element is of particular benefit since further decoding effort is not required and the primary element can simply receive the decoded data from the secondary element.

Whilst the decode quality information could be transmitted from the secondary element to the primary element in response to a request for such information from the primary element, in one embodiment said secondary element performs said further steps of determining and transmitting unsolicited by said primary element. Hence the secondary element can provide the primary element with an indication of its ability to decode at least one resource block without being requested to do so by the primary element, thus reducing the latency associated with requesting and receiving decode quality information.

In embodiments in which the secondary element sends unsolicited information to the primary element, whether this information is decode quality information or decoded data, the primary element may determine that such unsolicited information is no longer required and accordingly in one embodiment, after receipt of unsolicited information, said primary element selectively instructs said secondary element to cease sending such unsolicited information.

Whilst the decode quality information could be transmitted to the primary element from the secondary element unsolicited, in some embodiments the method comprises the further step, performed after performance of said primary decoding process, of: transmitting an information request to said secondary element from said primary element via said additional communications resource, said secondary element performing said further steps of determining and transmitting in response to said information request. Hence, the secondary element may determine the decode quality information and transmit it to the primary element in response to a request for such information from the primary element.

The information request may comprise further detail about what kind of information is being requested and in embodiments said information request specifies at least one of: a selected resource block; a modulation coding scheme; a MIMO mode; a transmission pre-coding matrix; and a reception pre-coding matrix.

When requesting such information the primary element may not only require an immediate response from the secondary element but may desire that such decode quality information should continue to be transmitted. Accordingly, in one embodiment said information request is configured to cause said secondary element to continue performing said further steps of determining and transmitting without being requested to do so by said primary element.

Such a request for continuing decode quality information to be transmitted may specify a duration for said second element to continue performing said further steps of determining and transmitting.

Whilst the primary element could make a request for decode quality information from a secondary element without providing any further information related to the result of its own primary decoding process, in one embodiment said information request further includes information derived from said primary decoding process. Accordingly, the primary element can provide the secondary element with information which indicates the relative success and outcome of that primary decoding process, enabling the secondary element to tailor its response accordingly, for example only providing decode quality information related to that part of the data which the primary element has been unable to decode alone.

In one embodiment the information derived from said primary decoding process comprises primary element signal-to-noise-ratio information. In this way the primary element can indicate to the secondary element a quality indication of its own primary decode. This may in particular indicate a frequency range in which the signal-to-noise ratio has been insufficient to allow the primary decode process to be successful on its own and therefore the additional information required from the secondary element should contribute in this frequency range if possible.

In one embodiment said information derived from said primary decoding process comprises decoded data generated by said primary decoding process. Accordingly, rather than merely providing an indication of how successful its own primary decoding process was, the primary element can provide the secondary element with at least some of the decoded data which resulted from the primary decoding process. Not only does this directly indicate to the secondary element how successful the primary decoding process was, but furthermore the secondary element may incorporate this decoded data from the primary decoding process into its own decoding process.

The reception of decode quality information from the secondary element can guide the primary element in terms of the data that it subsequently requests from the secondary element and in one embodiment said data request transmitted to said secondary element from said primary element via said additional communications resource is configured in dependence on said decode quality information received from said secondary element.

In addition, in such an embodiment, said data request transmitted to said secondary element from said primary element is configured to minimise data transmission via said additional communications resource. For example in order to minimise the usage of the additional communications resource, the data request can be configured such that where alternative transmissions are possible the lower bandwidth transmission is selected.

As mentioned above, in principle a feeder cluster need only comprise a primary element and a single secondary element, but in embodiments said feeder cluster comprises a plurality of secondary elements. The number of elements in a feeder cluster will vary depending on the implementation and which network components are able to provide useful information to one another.

In embodiments where there are several secondary elements the primary element may use the information available from the secondary elements in a number of different ways. For example in one embodiment in which the primary element receives decode quality information from a first secondary element the method may comprise a further step performed after receipt of said decode quality information, of: transmitting a further information request from said primary element to a different secondary element in said feeder cluster, said further information request requesting further decode quality information indicative of said different secondary element's ability to decode said at least one resource block. Accordingly, the primary element may request decode quality information from the secondary elements in its feeder cluster in turn. For example, if the decode quality information received from the first secondary element indicates that the quality of additional information available from that secondary element is relatively poor, the primary element may turn to another secondary element in its feeder cluster in order to determine if an improved decode could be obtained on the basis of information from that secondary element.

In one embodiment, said primary element transmits said further information request as a result of a determination that said decode quality information indicates that said secondary decoded data alone will be insufficient to enable said primary element to decode said at least one resource block.

There are various ways in which a primary element could select between available secondary elements in turn when issuing information requests, but in one embodiment information requests are transmitted to said plurality of secondary elements in turn, in a ranked order of expected ability to decode said at least one resource block based on prior decoding history. For example, if on the basis of experience a primary element has found a particular secondary element to most commonly amongst the secondary elements be able to decode the at least one resource block then that primary element may turn to that secondary element first. Other methods of ranking the order of the secondary elements are of course possible, for example based on an expectation related to the relative physical positioning of the secondary elements which respect to the primary element.

In one embodiment in which the feeder cluster comprises a plurality of secondary elements, each of said plurality of second elements receives said data transmitted via said wireless resource; performs said secondary decoding process to seek to decode said at least one resource block allocated for reception of data by said primary element and thereby generates said secondary decoded data; and transmits said information derived from said secondary decoded data to said primary element via said additional communications resource. In other words, each of the plurality of second elements performs its own secondary decoding process to seek to decode at least one resource block and transmits the information derived there from to the primary element via the additional communications resource. The primary element therefore receives information that is derived from a number of different secondary elements and can select between them in dependence on their relative usefulness.

In one embodiment the method comprises the further step, performed after performing said revised primary decoding process if said at least one resource block allocated for reception of data by said primary element has not yet been successfully decoded, of: transmitting a further data request from said primary element to a different secondary element in said feeder cluster, said further data request requesting further information derived from said secondary decoded data. Hence, the primary element can request additional data from different secondary elements in the feeder cluster if its revised primary decoding process has still not allowed the at least one resource block to be successfully decoded.

In such an embodiment the data requests may be transmitted to the plurality of secondary elements in turn in a ranked order of expected ability to decode said at least one resource block on prior decoding history.

The revised primary decoding process may seek to combine received data in a number of ways, but in one embodiment said revised primary decoding process comprises a chase combining process. In other embodiment the revised primary decoding process comprises an incremental redundancy process. Equivalently, when the secondary element(s) receive(s) decode information from the primary element, the secondary decoding process(es) carried out may use chase combining or incremental redundancy techniques.

Whilst the primary element may be able to successfully decode the at least one resource block using the information it can additionally obtain from the one or more secondary elements in its feeder cluster, it may be the case that such additional information is insufficient to allow a successful decode to take place, or at least that an undesirable number of iterations of the decode process would have to take place. In such an example the method may be arranged such that, if said revised primary decoding process does not successfully decode said at least one resource block, said primary element is configured to issue a retransmission request for said data transmitted via said wireless resource using said at least one resource block. Hence, whilst the present techniques may reduce the need for retransmission requests it may ultimately be preferable, or indeed necessary, to resort to a retransmission request for some data transmissions. Such retransmission requests may be provided in a number of known ways, for example via known HARQ techniques.

Such retransmission requests may comprise an indication of extent of decoding achieved by said revised primary decoding process. This technique may save valuable wireless resource bandwidth by enabling only a partial retransmission to take place, say only transmitted that part of the data which the primary element has been unable to decode.

When the wireless feeder network comprises a feeder network controller which administers the grouping of network components into a feeder cluster, in one embodiment said feeder network controller determines said elements of a feeder cluster in dependence on a sounding procedure previously carried out in said wireless feeder network. In order to expediently configure the wireless feeder network, a wireless feeder network controller may organise the components of the wireless feeder network to participate in a sounding procedure in which transmissions between wireless feeder network components are attempted for the purpose of establishing which network components are "visible" to one another (rather than for the purpose of normal network data transmission). Accordingly, not only does such a sounding procedure enable the wireless feeder network controller to determine how the feeder links should be established between the feeder base stations and feeder terminals, but also provides a useful indication of which network components have similar visibility to one another. For example, whilst a given feeder terminal and feeder base station may be paired up to provide a particular feeder link, the sounding procedure may indicate that another feeder base station also has (at least some) visibility of that feeder terminal. Accordingly, these two feeder base stations may be usefully grouped together as a feeder cluster since it has been recognised that these feeder base stations have some mutual visibility of at least one feeder terminal.

Whilst a sounding procedure could be performed purely for the purposes of determining the mutual visibility of wireless network components, in one embodiment said feeder network controller determines a schedule for use of said resource blocks in dependence on results of said sounding procedure.

However, not only can the sounding procedure (generally carried out for the purpose of determining how to set up the feeder links) be used to determine which wireless network components to group together as elements of a feeder cluster, but conversely success in improving the decode in a primary element by receiving data from a secondary element in a feeder cluster may also be used to improve the resource block schedule. In other words, ongoing experience of sharing information within a feeder cluster can provide information on the basis of which a schedule for use of resource blocks of the wireless resource can be updated.

In one embodiment said plurality of said wireless network components are configured to perform said grouping step with reference to said schedule.

Viewed from a second aspect, the present invention provides a wireless feeder network controller configured to administer the method of the first aspect.

Viewed from a third aspect, the present invention provides a wireless feeder network configured according to the method of the first aspect.

BRIEF DESCRIPTION OF THE DRAWINGS

The present invention will be described further, by way of example only, with reference to embodiments thereof as illustrated in the accompanying drawings, in which:

FIG. 6 illustrates an example set of data transfer rates at sequential decode stages for a given set of network parameters and quantisation parameters for different modulation coding schemes and MIMO modes;

FIG. 7 illustrates how the data transfer rates shown in FIG. 6 are altered by a variation in the quantisation parameters;

DESCRIPTION OF EMBODIMENTS

Figure 1:
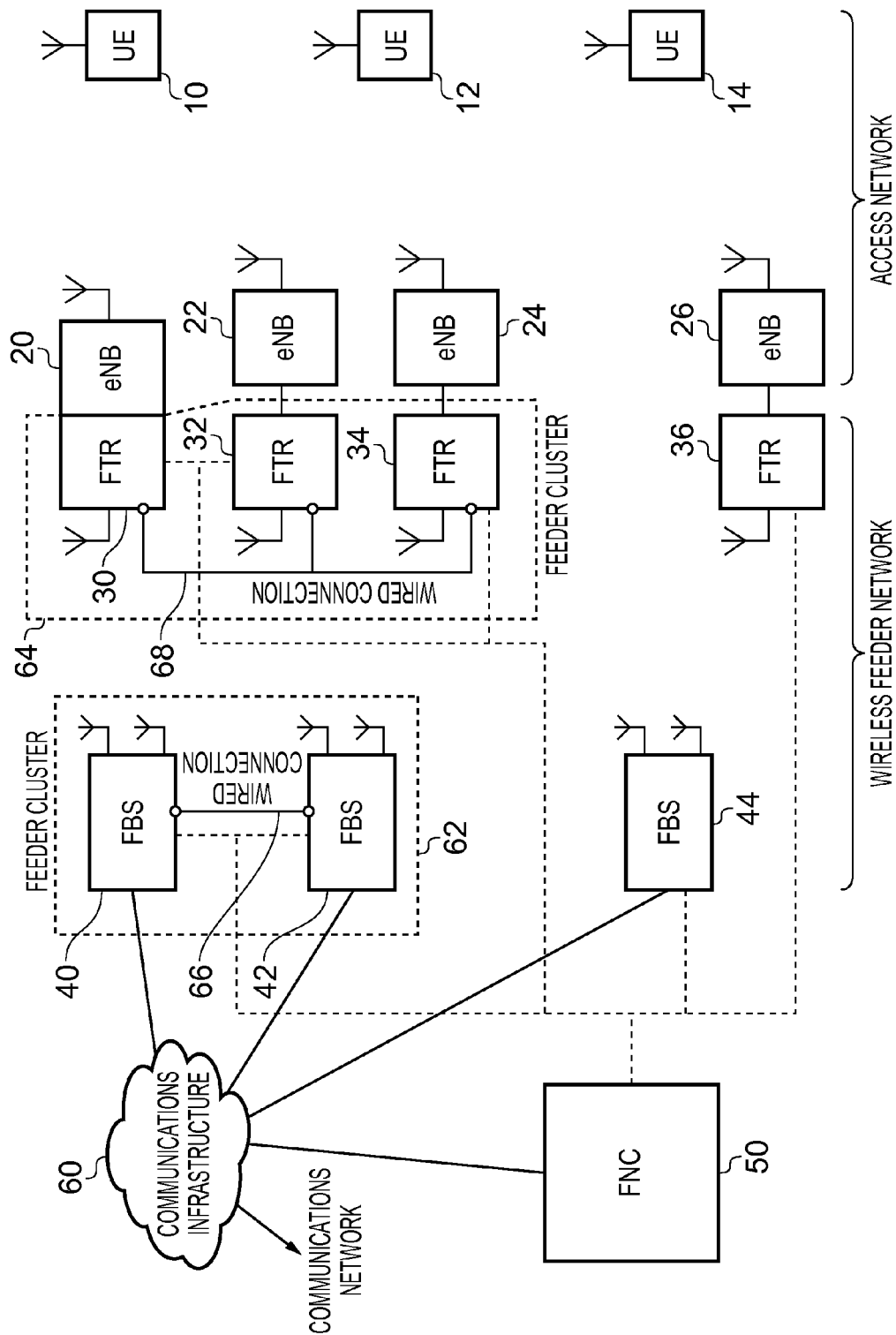
FIG. 1 schematically illustrates a wireless feeder network used to couple access base stations of an access network with a communications network in one embodiment.

FIG. 1 schematically illustrates a wireless feeder network which is arranged to couple access base stations of an access network with a communications network in one embodiment. The illustrated components of the access network are the items of user equipment (UE) 10, 12, 14 in communication with access base stations (eNB) 20, 22, 24, 26. Depending on network loading and on the current geographical position of a given UE, that UE communicates wirelessly with a selected one of the access base stations such that uplink data can be communicated from the UE onwards towards the communications network and conversely downlink information received from the communications network can be transmitted to the intended UE. The access network could be configured to perform this communication according to a number of known protocols, such as Wi-Fi, WiMAX, LTE and so on, the specific details of which are not discussed further herein.

Each access base station of the access network is associated with a feeder terminal (FTR) 30, 32, 34, 36 respectively. The feeder terminals are components of the wireless feeder network and communicate with feeder base stations (FBS) 40, 42, 44 via a wireless resource allocated for use by the wireless feeder network. The association between a given feeder terminal and access base station may be relatively close, as in the example of feeder terminal 30 and access base station 20 which are in fact provided as a single integrated component for deployment. Alternatively, the feeder terminal and access base station may be provided as individual components which are then connected together by a suitable communication coupling (such as a dedicated bus, Ethernet connection etc) as in the example of feeder terminal 32 and access base station 22. Whatever their specific configuration, the access base station and associated feeder terminal serve to receive uplink communication data transmitted from user equipment and to pass this on a feeder link established between a feeder base station/feeder terminal pair towards the communications network. Data that is received by an access base station and passed to the associated feeder terminal will typically be subjected to various packetization and encryption procedures which are not described in detail herein.

Data received by the feeder base stations 40, 42, 44 is passed via a wired connection to communications infrastructure 60 and from there into the communications network. Conversely, data received from the communications network is passed via a wired connection from the communications infrastructure 60 to the feeder base stations for transmission to the appropriate feeder terminal. The overall configuration and operation of the wireless feeder network is controlled by feeder network controller 50. The connection between the feeder network controller 50 and the feeder base stations/feeder terminals of the wireless feeder network is schematically shown as a dotted line, since this communication path could in principle be provided by a wired connection to each of these feeder network components, but could also (and more typically) be provided by the wired connection to each FBS and the wireless communication path (via an FBS) to each feeder terminal. In this embodiment the feeder network controller (FNC) 50 is in overall control of the allocation of the wireless resource used by the wireless feeder network for providing a feeder link between a given feeder base station and a given feeder terminal. This allocation is performed by sub-dividing the wireless resource into a plurality of resource blocks, which are then used by the feeder network components according to a predetermined schedule, such that multiple feeder links can be established in the feeder network without communication collisions occurring. An example sub-division of the wireless resource into resource blocks is discussed below with reference to FIG. 3.

As is known to be the case in a wireless network which uses a finite wireless resource to provide its communication channels, when allocating the resource blocks into which that wireless resource has been sub-divided a balance must be struck between allocating a greater proportion of the wireless resource to a given feeder link, thereby improving the reliability of that feeder link, but occupying more of the wireless resource which could otherwise have been used in other feeder links, and allocating less of the wireless resource to a given feeder link, but accepting that the throughput of that feeder link will be correspondingly lower. Because of such constraints, the wireless feeder network schematically illustrated in FIG. 1 makes use of known HARQ techniques for the re-transmission of data packets which have not been successfully received and decoded. However, whilst the retransmission of a data packet can ensure that a given data packet will be successfully received and decoded, the retransmission itself must be scheduled amongst the network traffic within the wireless feeder network and accordingly imposes an additional demand on the limited bandwidth available. To address this problem, the wireless feeder network schematically illustrated in FIG. 1 employs a technique whereby components of the wireless feeder network are grouped together into a "feeder cluster". Accordingly, in the example shown in FIG. 1, feeder base stations 40 and 42 are grouped together as an example feeder cluster 62 whilst feeder terminals 30, 32, 34 are grouped together as an example feeder cluster 64. The grouping of elements into feeder clusters may be dictated by the FNC 50 (by direct communication with the elements) or may be more autonomous in that the elements "discover" one another in their local environs.

The components of a feeder cluster are provided with an additional communications resource (i.e. separate from the wireless resource used in the wireless feeder network to provide the feeder links) via which the elements of a feeder cluster can communicate with one another. In feeder cluster 62 this is provided by the wired connection 66, whilst in feeder cluster 64 this is provided by the wired connection 68. This additional communications resource in particular allows elements of a feeder cluster to support one another in their respective attempts to decode resource blocks which have been allocated for reception of data by one element of the feeder cluster. In the following, the element of the feeder cluster which is seeking to decode a resource block allocated to it for reception of the data is referred to as a "primary" or "master" element, whilst an element of the feeder cluster which is acting in the supporting role to the "primary" or "master" element is referred to as a "secondary" or "slave" element. The nature of these roles within a feeder cluster and of the different types of information which maybe exchanged between elements of a feeder cluster will be described in more detail below. A wired additional communications resource also provides one way in which the elements of a feeder cluster may "discover" one another, by virtue of co-located elements being coupled together by this wired connection.

Figure 2:
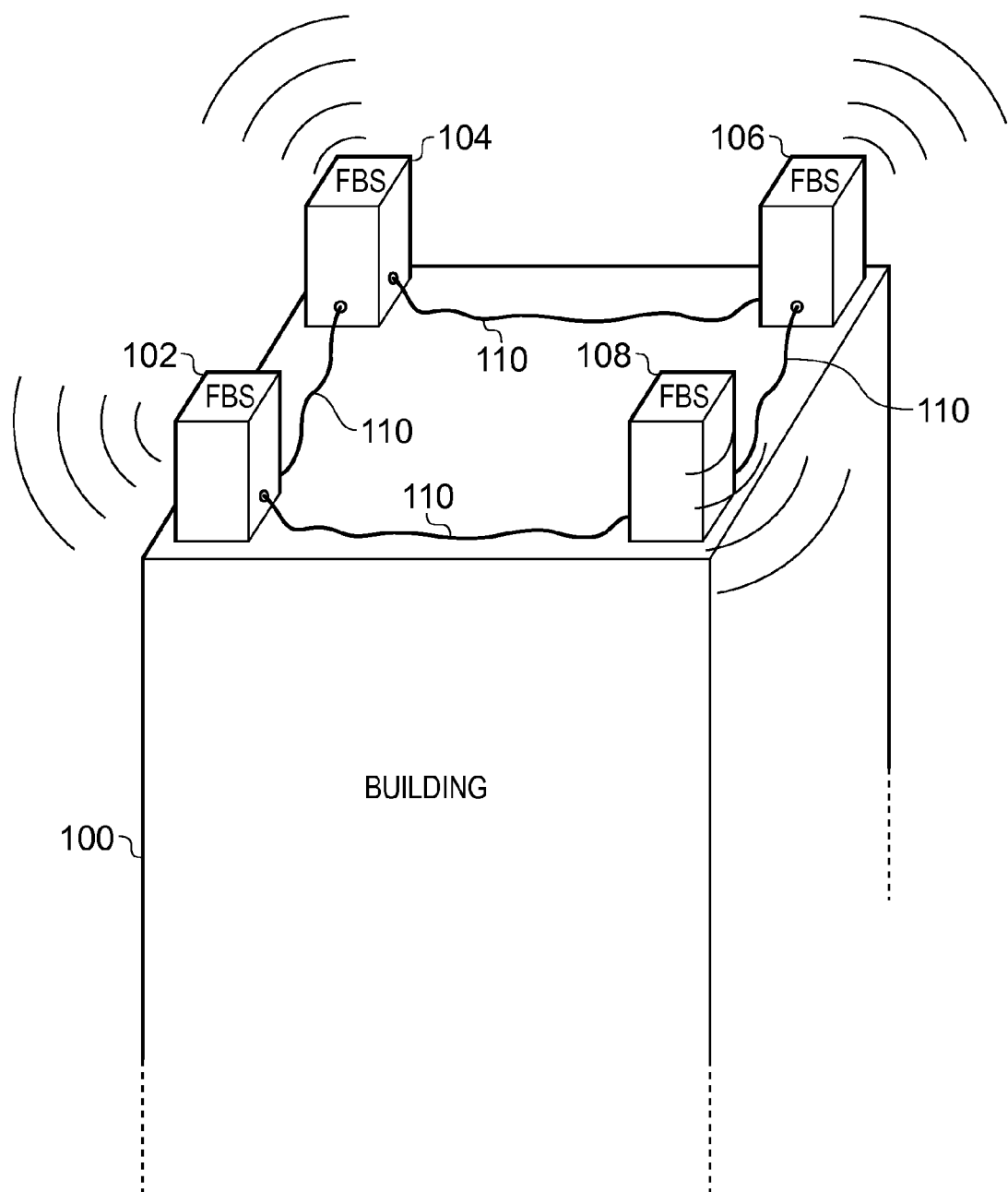
FIG. 2 schematically illustrates a group of four feeder base stations positioned on top of a building and coupled together by a wired connection in one embodiment.

FIG. 2 schematically illustrates a physical example of the deployment of four feeder base stations 102, 104, 106, 108 on the roof of a building 100 in one example embodiment. The four feeder base stations illustrated are positioned at the respective corners of the roof of building 100 such that an essentially 360 degree coverage for this part of the wireless feeder network to which these feeder base stations belong is provided. Accordingly, the antenna of each feeder base station are configured such that the transmission and reception coverage of each feeder base station is directional, being most strongly adapted to the reception and transmission of data in the direction in which the respective corner of the building points. However, each feeder base station also has a non-negligible ability to receive data on the periphery of its antenna coverage and hence for example FBS 102 can at least partially receive data packets transmitted to either FBS 104 or FBS 108. Similarly each of the other FBSs can at least partially receive data packets intended for either of its immediate neighbours. The present techniques taken advantage of this fact and group the feeder base stations shown in FIG. 2 accordingly. Thus, considering FBS 102 as the primary element, FBS 104 and FBS 108 act as secondary elements in a feeder cluster formed by FBS 102, FBS 104 and FBS 108. Equally, viewing FBS 108 as the primary element, FBS 102 and FBS 106 act as the secondary element in a feeder cluster formed by FBS 102, FBS 106 and FBS 108. The additional communications resource used within a feeder cluster is provided in the example of FIG. 2 by the Ethernet cable 110 which connects the feeder base stations to one another. It should be appreciated therefore that although the wired connection 110 between the feeder base stations is fixed, the definition of each feeder cluster depends on which feeder base stations are under consideration and in particular a given feeder base station may interact with a different set of other feeder base stations depending on whether that feeder base station is acting as a primary or secondary element.

Figure 3:
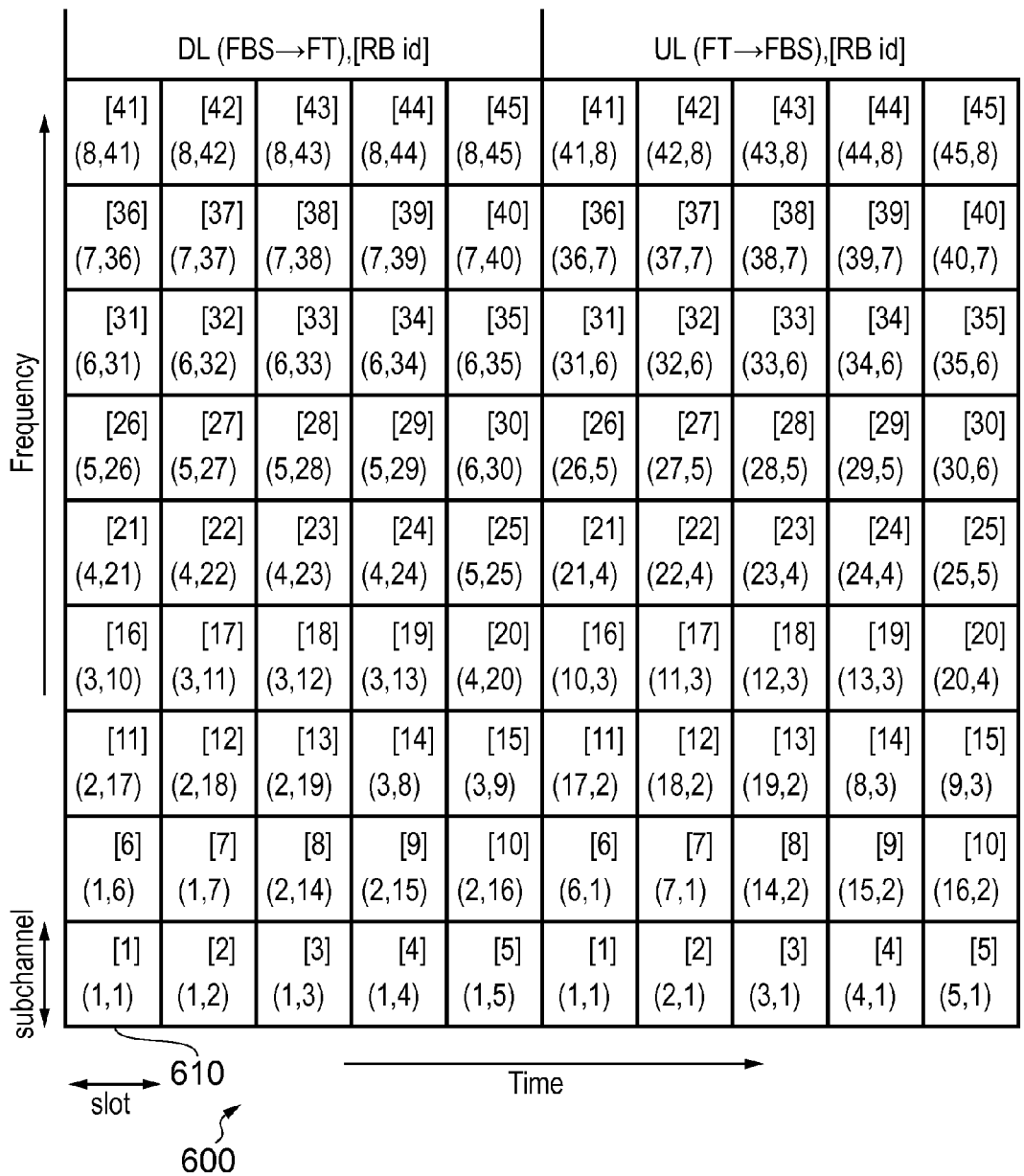
FIG. 3 illustrates the sub-division of a wireless resource into resource blocks by sub-division into frequency sub-channels and time slots in one embodiment.

In order to ensure that the wireless feeder network provides an efficient wireless backhaul, it is necessary for the wireless resource available to the wireless feeder network to be used in a spectrally efficient a manner as possible. The wireless resource comprises a plurality of resource blocks that can be considered to form orthogonal resources. Whilst these orthogonal resources can be established in a variety of ways, in one embodiment the wireless resource is represented in two dimensions as shown in FIG. 3, namely the time dimension (on the horizontal axis) and the frequency dimension (on the vertical axis). The wireless resource is sub-divided into horizontal and vertical strips. The horizontal strips are called sub-channels and the vertical strips are referred to as slots. In Time Division Multiple Access (TDMA), the entire frequency band is assigned to a single user. Multiple users share the radio spectrum by transmitting in different frequency slots. In Frequency Division Multiple Access (FDMA), each user is assigned to a fixed sub channel.

In order to increase the system throughput, orthogonal resources may reused throughout the network at a cost of increase inter-cell interference. Interference may be reduced by applying well established reuse plans. Such schemes are generally not adaptive, are overly conservative and thus do not permit the maximum utilisation of a wireless feeder network. Accordingly, the wireless feeder network discussed herein makes use of traffic-aware multiple access assignments (referred to as global schedules), such as those described in UK patent application numbers 1016650.2, 1016648.6 and 1016647.8 the entire contents of which are incorporated herein by reference. Such a global schedule is determined under control of the feeder network controller and represents a set of instructions on resource utilisation and the associated anticipated network interference. Thus, a global schedule is an allocation of one or more sub-channel/slot grids (referred to herein as a resource blocks or resource elements) to a number of feeder base stations to enable down link (DL) communication to a number of feeder terminals. Likewise one or more resource blocks are allocated to a number of feeder terminals to enable uplink (UL) communication with the feeder base stations. Furthermore, each resource block includes an instruction to support MIMO transmission and the associated network wide co-channel interference. FIG. 3 illustrates a straight forward resource block assignment that yields no interference in the network. The square bracketed numbers denote the resource block ID number. For the DL(x, y) denotes the transmission from FBSx to FTy and for the UL(x, y) denotes the transmission from FTx to FBSy. The distribution of such a resource block usage schedule to the wireless feeder network can thus also inform the elements of a feeder cluster which other elements are expecting to receive data in a given time/frequency slot and therefore can inform a secondary element as to which resource blocks a primary element is seeking to decode at any given frame.

Figure 4:
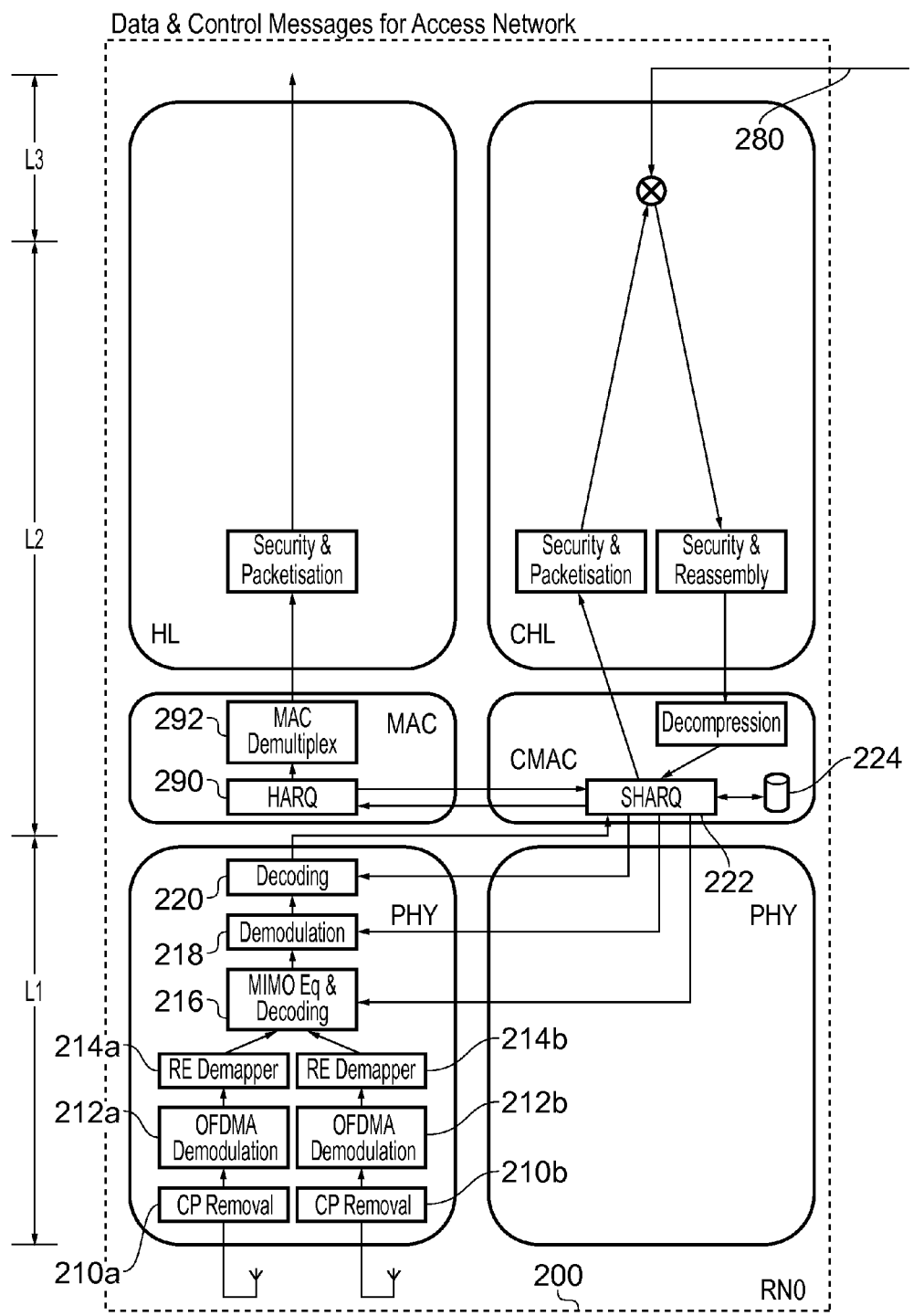
FIG. 4 schematically illustrates three feeder terminals in a wireless feeder network which are coupled together by a wired connection in a feeder cluster.
Figure 4:
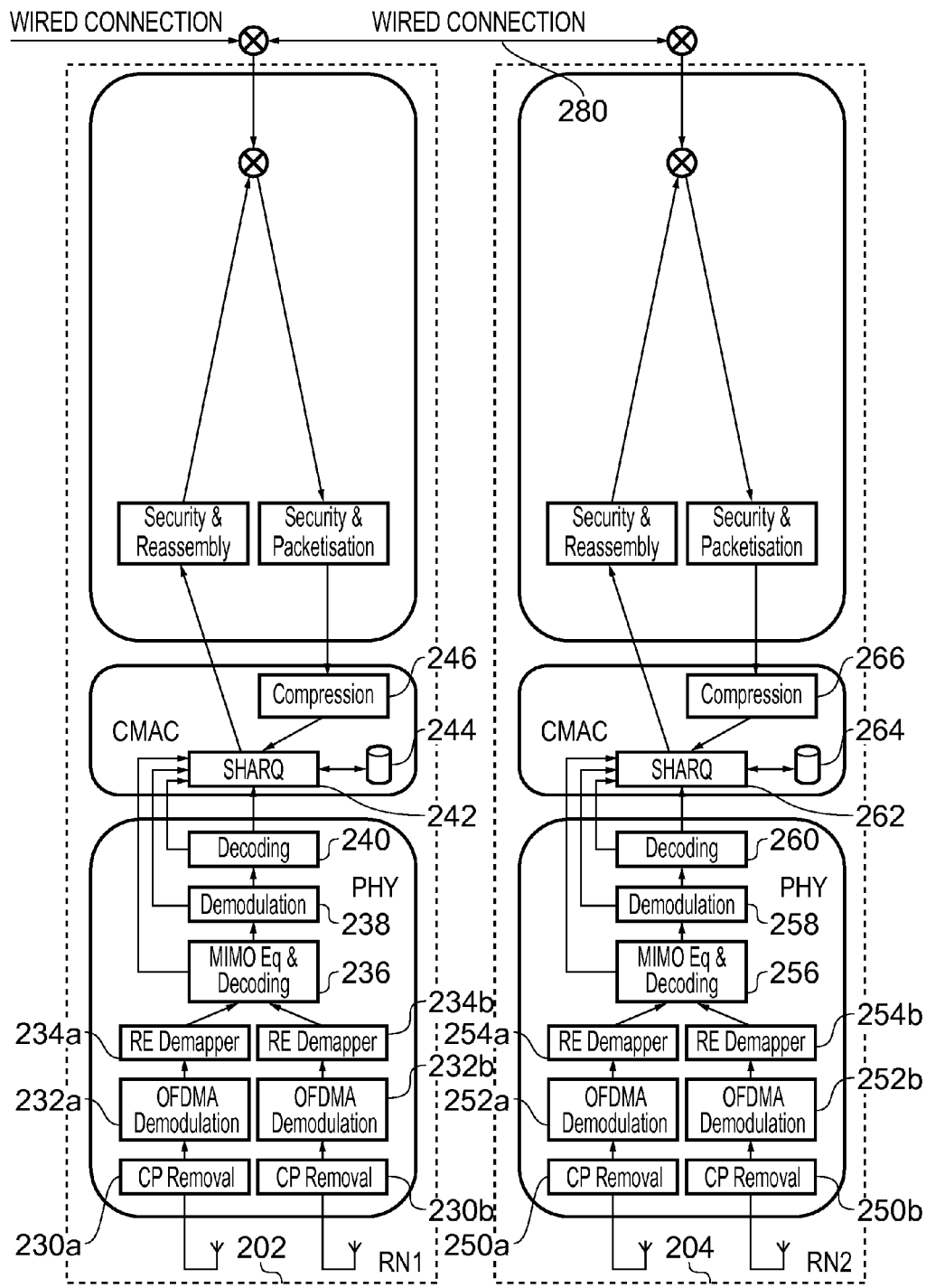

FIG. 4 schematically illustrates the internal configuration of three wireless feeder network components 200, 202, 204 which have been grouped together as a feeder cluster. For the purposes of this discussion, component 200 (RN0, i.e. resource node 0) is illustrated as acting as the primary element, whilst elements 202 and 204 (RN1 and RN2 respectively) are illustrated as acting as the secondary elements in the feeder cluster. In this example, elements 200, 202, 204 are feeder terminals which receive data transmitted by a feeder base station over a feeder link and pass this into the access network. It should be understood that "data" may refer to both content data and control signals in this context. Each element is schematically represented in terms of three levels (L1, L2, L3) in which L1 corresponds to the physical (PHY) level, L2 corresponds to the Media Access Control (MAC) layers and some layers (HL), and L3 corresponds to the final stage of the intercommunication between the elements of this feeder cluster at which packetized data is sent out to and received from the other elements of the feeder cluster.

Within the PHY layer of the primary element 200, the sequence of stages of decoding comprises: cyclic prefix (CP) removal 210a/b, orthogonal frequency division multiple access (OFDMA) demodulation 212a/b, resource block (aka resource element (RE)) de-mapping 214a/b, multiple-input multiple-output (MIMO) equalisation and decoding 216, demodulation 218 and a final decoding (error correction) stage 220. The final decoded output of the decoding stage 220 is passed to the cooperative media access control (CMAC) layer, in particular to the "synthetic HARQ" (SHARQ) control unit 222. SHARQ block 222 determines if a resource block allocated to element 200 for the reception of data has been successfully decoded or not. If it has not, SHARQ block 222 can communicate with the equivalent components 242 and 262 in elements 202 and 204 to seek to make use of information relating to that resource block received by elements 202 and 204. This inter-element communication process will be described in more detail with reference to the following figures, but as illustrated in FIG. 4 the additional information received by SHARQ unit 222 can be fed back to a selected one of the decoding stages 216, 218 or 220 in order to improve the ability of that decoding stage to decode the resource block(s) and therefore for the overall decoding of the resource block(s) to be successful. SHARQ unit 222 further has access to a storage unit 224 in which data related to the current decoding processes can be stored. In particular, storage unit 224 enables SHARQ unit 222 to store and subsequently combine decoding levels within element 200 and from levels within elements 202 and 204. Storage unit 224 could for example be provided by RAM local to the SHARQ unit. This storage is sufficient that partial decode data for several frames may be held, such that if necessary soft combination of data arriving via multiple retransmission attempts (see later discussion of HARQ retransmissions with reference to FIG. 12) can be made.

Feeder terminals 202 and 204 each comprise the same set of sub-components in their PHY layers as discussed above with reference to feeder terminal 200. However, the information flow schematically illustrated by the arrows in FIG. 4 shows paths leading from MIMO equalisation and decoding stages 236/256, from demodulation stages 238/258 and from final decoding stages 240/260 to the respective SHARQ units 242/262 of feeder terminals 202/204 respectively. It should be understood that these paths correspond to the respective roles (namely "primary" or "secondary") which these feeder cluster components are playing in the configuration illustrated in FIG. 4. Accordingly, the SHARQ units 242, 262 are configured to gather information related to the decoding process taking place at various levels in the decode chain of the respective feeder terminal. In particular, a SHARQ unit in a secondary component can transmit information related to a selected decoding level of its own decoding chain to the SHARQ unit of the primary component in the feeder cluster. As will be discussed in more detail with reference to the following figures, this transmission of information may be performed in a response to a request received from the SHARQ unit of the primary component or alternatively may be an unsolicited transmission. Furthermore the information transmitted may take a number of forms, for example information indicative of the relative usefulness of decoded data available at a particular decode level (for example parameterized as an effective signal-to-noise-ratio (ESNR) per MIMO stream) or may comprise (at least a portion of) the actual decoded data from that decoding level. Note that SHARQ units 242, 262 have access to local storage units 244, 264 in a similar manner to local storage unit 224 provided for SHARQ unit 222. One particular usage of the local storage units 244, 264 can be to buffer information received from the various levels of the respective decode chain for a number of subsequent transmission frames, so that this information remains available for access by a subsequently received information request from the primary component's SHARQ unit. Data transmitted from the SHARQ units 242, 262 may be suitably compressed (by compression units 246, 266) before being passed to the higher layers of the respective feeder terminal (where various security protocols (e.g. encryption) may be implemented as well as packetization of the data appropriate for transmission within the feeder cluster). Further detail of these higher layers is omitted here for clarity of illustration and description. Feeder terminals 200, 202, 204 are coupled together by a wired connection 280, which may for example be provided by an Ethernet connection.

Returning to feeder terminal 200, if the co-operative data-sharing techniques supported by the SHARQ units of the respective feeder terminals do not enable the primary component to successfully decode a given data transmission, the primary component (in this case feeder terminal 200) can turn to its HARQ unit 290 which administers the implementation of known HARQ techniques to request a retransmission of the appropriate data packet or packets. A request for a HARQ retransmission may include an indication of the extent of decode success thus far such that a reduced retransmission may follow. Successfully decoded data is passed on to the access network (via MAC demultiplexer 292 and further higher layer stages such as "security and packetization", which are mostly omitted here for clarity).

Figure 5:
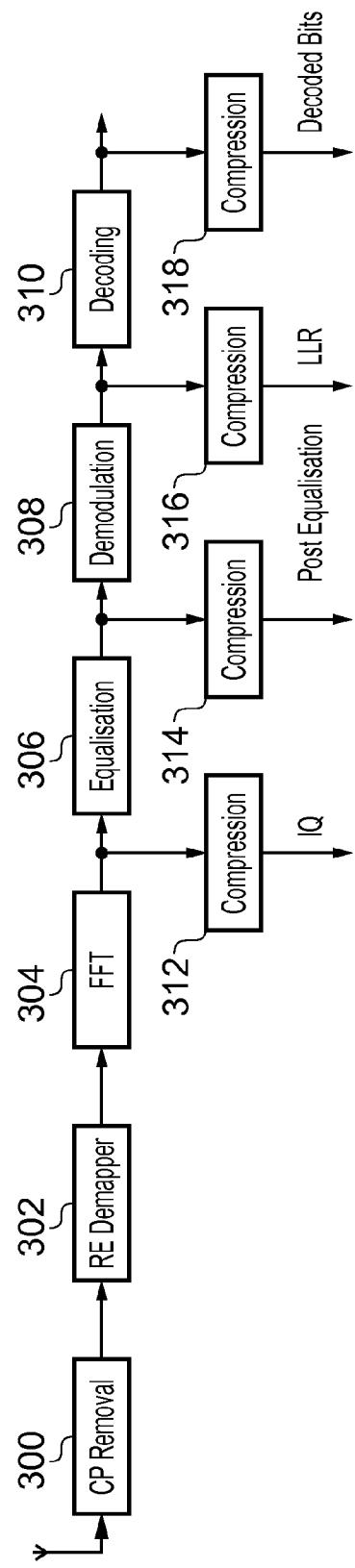
FIG. 5 schematically illustrates various decoding stages in a wireless feeder network component in one embodiment.

FIG. 5 schematically illustrates the decoding chain and the manner in which decoded data may be selected (and possibly compressed) from a number of different stages within the decode chain. After the initial stages of cyclic prefix removal 300, resource element (aka resource block) de-mapping 302 and Fast Fourier Transformation (FTT) 304, the "raw" IQ data may be selected, and may be further comprised (e.g. quantized and/or decimated) in unit 312. The decode chain continues via an equalization step 306, after which post-equalization data may be selected (and possibly compressed in unit 314). The next stage is a demodulation stage 308 after which LLR (log likelihood ratio) data (possibly compressed by unit 316) may be selected. Finally, the last decoding (error correction) stage 310 yields the fully decoded bits which can be selected (possibly compressed at step 318).

The particular decode level at which data is selected to be transmitted from a secondary component in a feeder cluster to a primary component can have a significant effect on the data transfer rate which results. In addition, the modulation coding scheme (MCS) and MIMO mode according to which the data is transmitted, as well as the level at which the data from a given decode level is quantized also have a significant effect on the data transfer rate. This is illustrated in FIG. 6 which presents, for a given set 400 of network transmission parameters, how the data transfer rate at each decode level varies with respect to the modulation coding scheme and MIMO mode for a given set of quantization parameters 405. It can be seen that the data transfer rates 410 vary significantly between the decode levels. FIG. 7 illustrates the set of data transfer rates 420 which result when a different set of quantization parameters 415 is used for the same network configuration parameters 400). In general therefore elements in a feeder cluster are configured to select decode levels and quantisation parameters which will result in the minimum data transfer rate on the connection between them. Equally, where the data rates from sequential decoding stages are predicted to be the same, the later decoding stage is preferentially transmitted, since although this does not affect the data transfer rate, it reduces the computational load for the recipient.

As mentioned above, the information exchanged between components of a feeder cluster according to the present technique may be carried out in a number of different ways. FIGS. 8-11 now discuss four example protocols according to which information may be exchanged between feeder cluster components.

Figure 8:
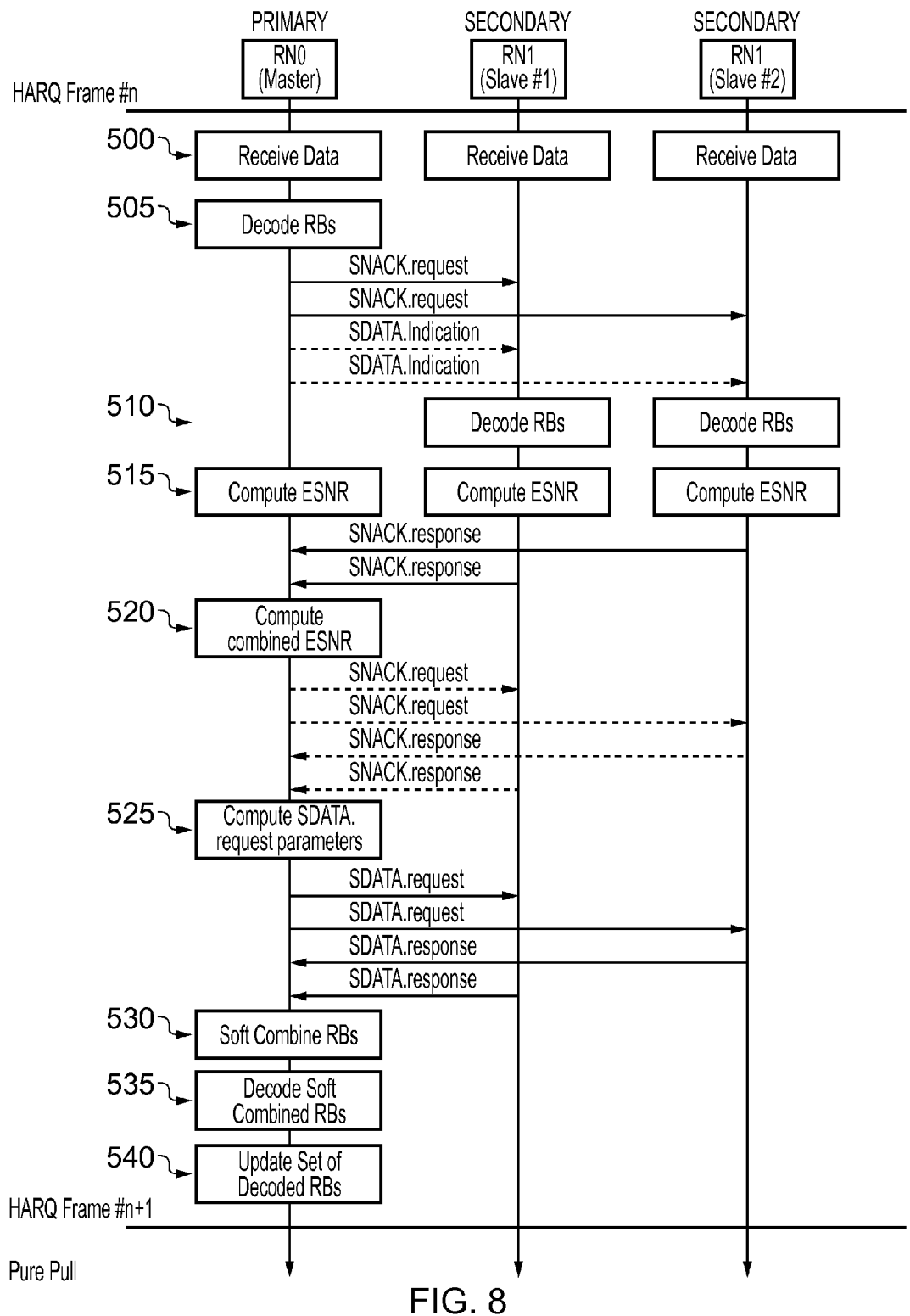
FIG. 8 schematically illustrates a sequence of operational steps and exchanged information within a feeder cluster in which the secondary elements act as such at the request of the primary element.

FIG. 8 schematically illustrates information exchange in a feeder cluster comprising three components, namely a master RN0 (the primary element) and two slave components RN1 and RN2 (the secondary elements). The sequence of illustrated steps 500-540 take place within a single HARQ frame. Firstly, at step 500, each component in the cluster receives the transmitted data. At step 505, the master performs a primary decoding process to seek to decode those resource blocks allocated to it for reception of data. As a result of this primary decoding process, the master determines that it is unable to fully decode all of those allocated resource blocks and accordingly issues a SNACK.request to each of the secondary components within the feeder cluster. This SNACK.request (so called because it is modelled on a HARQ "NACK" transmission and dubbed "synthetic (S)"). Each information element (IE) within a SNACK.request specifies a resource block, the modulation coding scheme (MCS), the MIMO mode, and Tx/Rx pre-coding matrices. The SNACK.request may further include an indication of the primary component's effective signal-to-noise ratio (ESNR) for the relevant resource blocks. In addition the primary element may additionally (dashed arrows at step 505) transmit an SDATA.indication to one or more of the secondary elements, which comprises at least some of the decoded data generated from the primary element's decoding efforts at step 505. Providing this data to the secondary elements may improve their own attempts to decode the relevant resource blocks (for example by chase combining) but this comes at the expense of the additional bandwidth on the communications path which connects the elements of this feeder cluster together. Accordingly the decision as to whether to transmit this SDATA.indication may be dynamically resolved in dependence on current usage of the communications path.

In response to reception of the SNACK.request, the secondary elements in the feeder cluster (at step 510) attempt to decode the relevant resource blocks. Then at step 515, the secondary elements compute their own ESNR values for the relevant resource blocks and return a corresponding response (SNACK.response) to the primary component. This response may be as simple as a "decode yes/no" answer (indicating that the secondary component is (not) able to decode the relevant resource block alone) or may for example comprise a specification of that secondary element's ESNR. The ESNR may itself be given as a scalar value (typically given per MIMO stream) or as a more detailed frequency dependent vector of values (again typically per MIMO stream). Note that in FIG. 8 the primary element is illustrated as computing its own ESNR at stage 515, but it should be recognised that the primary element may compute its ESNR before the secondary elements do. Indeed this determination may take place immediately after the primary element attempts the decode at step 505, in particular this being necessary if this ESNR information is to be included in the SNACK.request.

At step 520, the primary element computes a combined ESNR on the basis of its own decoding attempt and the indications received from the secondary elements with regard to their respective ESNR for these resource blocks. Hence the primary element can (probabilistically) determine if decoding these resource blocks will be possible on the basis of the available information within the feeder cluster. In particular, the primary element can determine what decoded data it is worthwhile requesting from one or more secondary elements in order to achieve the desired decode.

Optionally (as shown by the dashed arrows between steps 520 and 525) the primary element may issue further SNACK.requests at this stage. For example, in one configuration, the primary element may issue SNACK.requests to the secondary elements in turn, the first request being sent to the secondary element, say, which has previously been most successful in supporting the primary elements decoding efforts. The primary element may log this success rate information for this purpose. Hence, if the secondary element to which the first SNACK.request was sent has resulted in a SNACK.response indicating that the additional information which can be provided by this secondary element will be insufficient to allow the primary element to perform a full decode, then the primary element may turn to a second (or a number of further) secondary element(s). Having gathered sufficient information on the basis of the ESNR values available from the other elements of the feeder cluster, at step 525 the primary element determines the decoded data which it should request from one or more secondary elements in the feeder cluster to enable it to perform the full decode, this being parameterized as a SDATA.request. This SDATA.request is transmitted to the relevant secondary element(s). The SDATA.request specifies the data source (i.e. the decode level from which this data should be extracted: raw IQ data, post equalization data, LLR data or post FEC data) and further specifies the requested compression (both in terms of decimation and quantization). In response to reception of this SDATA.request, the relevant secondary element transmits a SDATA.response which comprises the requested decoded data. At step 530 the primary element performs a soft combination of the resource blocks at the relevant decode levels and at step 535 seeks to perform a revised primary decoding process to attempt to decode the soft combined resource blocks. Finally at step 540 the set of data resulting from the decoding of these resource blocks is updated.

Figure 9:
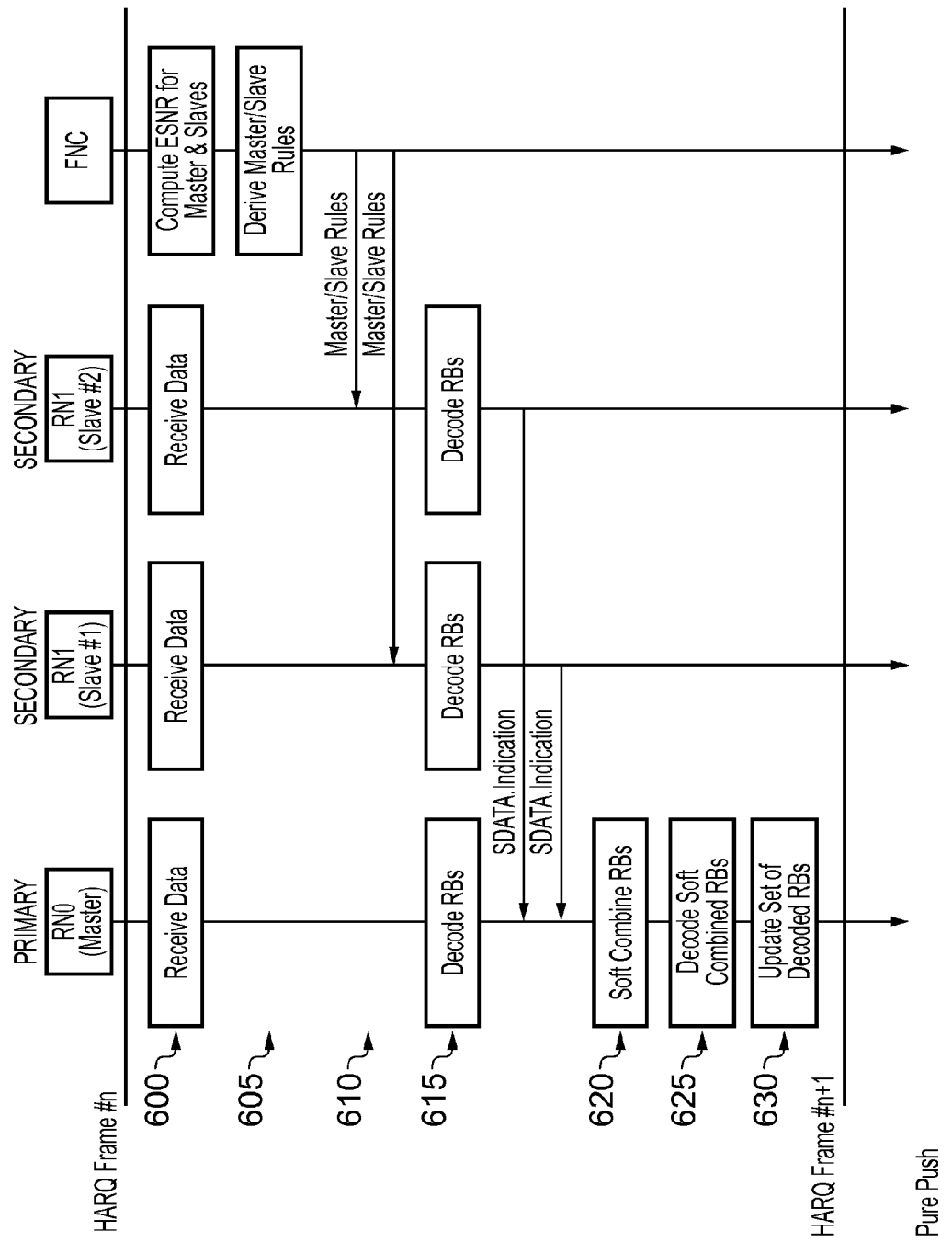
FIG. 9 schematically illustrates a sequence of operational steps and exchanged information in a feeder cluster in which the secondary elements pass information to the primary element unsolicited.

FIG. 9 schematically illustrates a configuration in which secondary elements in a feeder cluster transmit data unsolicited to the primary element to support its decoding efforts. In this embodiment, the involvement of the feeder network controller (FNC) is also shown. Step 600 illustrates each of the elements of the feeder cluster (one primary and two secondary) receiving transmitted data. Step 600 also shows the FNC computing an ESNR for both types of element in the feeder cluster. The FNC does this by computing ESNR using results obtained from a sounding process. On the basis of the computed ESNRs at step 605 the FNC derives a set of rules to be distributed to the secondary elements in the feeder cluster. These "master/slave" rules (i.e. primary/secondary rules) essentially specify the conditions under which the secondary element should transmit decoded data information to the primary element in the feeder cluster. Furthermore, the rules may also specify the decode level from which the data to be transmitted to the primary element should be taken from in the secondary element (e.g IQ, post equalisation, LLR or post FEC). The rules can additionally specify whether the data should be decimated, quantised and/or compressed. The FNC has the overview of the allocation of resource blocks for the establishment of feeder links within the wireless feeder network and accordingly this information can be included in the rules, such that a secondary element knows which resource blocks are allocated to the primary element in the feeder cluster and this can be seen as one of the rules passed to the secondary element from the FNC. The set of rules which are distributed to a given feeder cluster by the FNC are constructed such that the available bandwidth on the communications resource which couples together the elements of the feeder cluster (e.g wired connection 68 for feeder cluster 64 in FIG. 1) is respected. This is necessary because according to this configuration, the secondary elements transmit decoded data to the primary element unsolicited and the potential would otherwise exist for the secondary elements to swamp the communication path with data. Example rules which may be given can be rather simply constructed, e.g. never forward or always forward particular data e.g. a given resource block at a given decoding level with a given decimation and quantisation. The rules may also make reference to particular ESNR ranges and may be specified individually for each MCS/MIMO permutation. Typically, a number of different rules are be provided to each secondary element and each secondary element is configured to evaluate the outcome of these multiple rules. Where more than one data transmission is possible as the result of the evaluation of those rules, a selection is made of that data transmission which will result in the minimum data size being transmitted. In another embodiment the primary element is configured to determine the decoding rules for each of its secondary elements. This may for example follow an initial network configuration in which the rules are distributed by the FNC, after which each primary element is configured to communicate its own rules (or just updates/adjustments thereto) to its associated secondary elements.

Accordingly, each secondary element which determines that a rule is satisfied then transmits a SDATA.indication to the primary element in the feeder cluster (these data transmissions being effectively the same as the SDATA.response transmissions at step 525 in FIG. 8). Finally, the primary element at step 620 combines the information it has received from one or more secondary elements with its own data in a soft combination process and at step 625 attempts to decode that soft combined data. At step 630 an updated set of decoded resource blocks is generated within the primary element.

Figure 10:
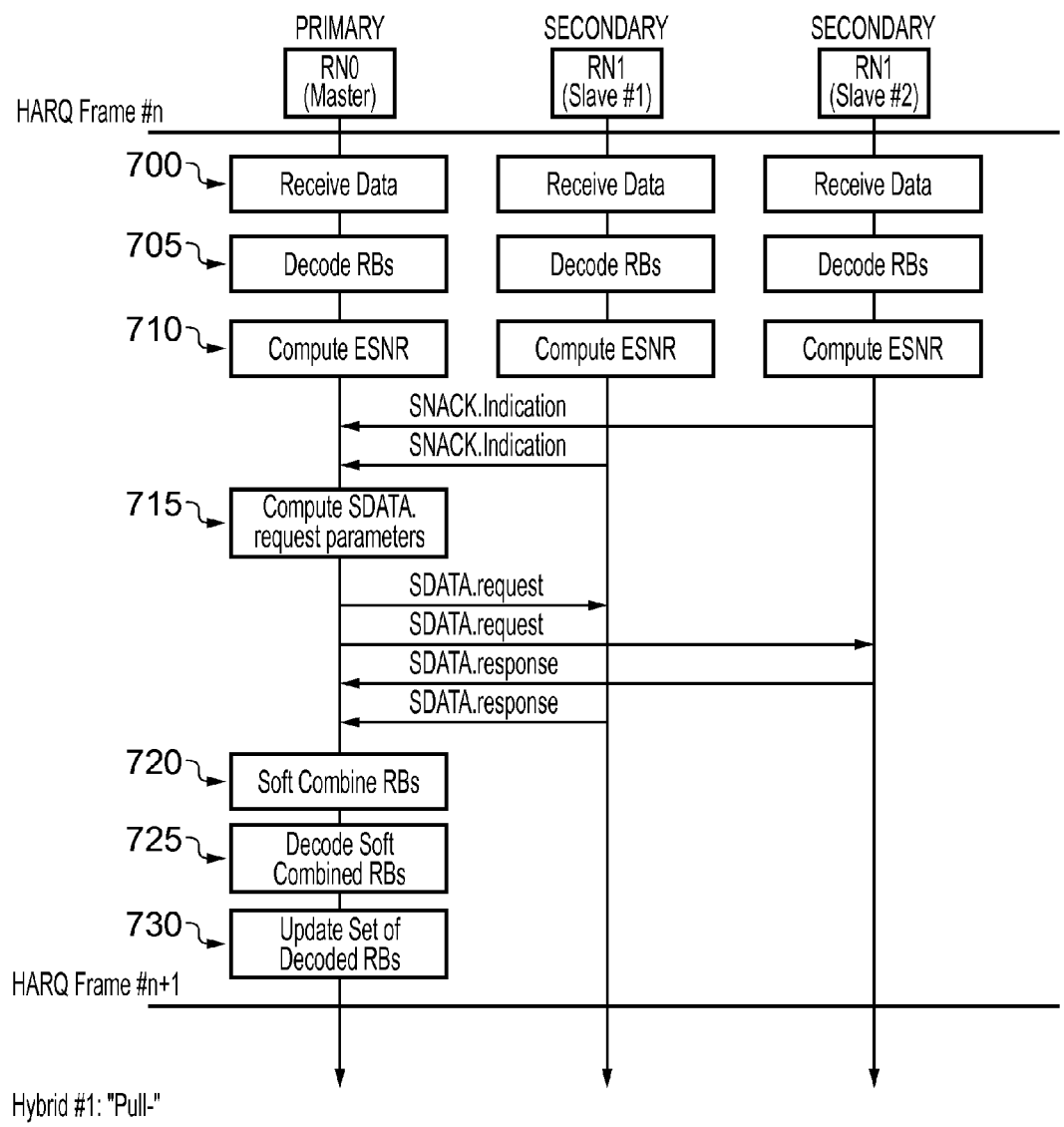
FIG. 10 schematically illustrates a sequence of operational steps and exchanged information in a feeder cluster in an embodiment in which an initial level of information is passed unsolicited from the secondary elements to the primary element and on the basis of this information the primary element requests more information from one or more secondary elements.

FIG. 10 illustrates the interactions within a feeder cluster in an embodiment which combines some aspects of the FIG. 8 embodiment and some aspects of the FIG. 9 embodiment. In particular, in the embodiment shown in FIG. 10, the secondary elements transmit an indication of their ability to decode the relevant resource blocks to the primary element unsolicited, but transmissions of decoded data from each secondary element to the primary element are limited to those that are explicitly requested by the primary element. Hence, at step 700 the elements of the feeder cluster receive transmitted data, at step 705 the elements attempt to decode those resource blocks and at step 710 each element individually computes its ESNR values. Thereafter, the secondary elements transmit an indication of their ability to decode these resource blocks (in the form of a SNACK.indication) to the primary element. Again, this indication may take a simple yes/no format or may be a more detailed breakdown of the computed ESNR. On the basis of these received indications from the secondary elements and on the basis of its own decode attempt, the primary element (at step 715) determines what data it should request from the secondary elements in its feeder cluster and formulates one or more SDATA.requests which are then transmitted to the relevant secondary elements. Again, it should be noted that whilst two such requests are illustrated in FIG. 10 being sent in parallel to the secondary elements in the feeder cluster, the primary element may send these requests in an ordered format such that a request to the first secondary element is only followed by a request to a second secondary element if the information received from the first secondary element appears insufficient to allow the primary element to perform the full decode. Having received the SDATA.responses from the secondary elements, at step 720 the primary element performs a soft combination of the resource blocks, at step 725 attempts to decode these soft combined resource blocks and at step 730 updates the set of decoded resource blocks.

Figure 11:
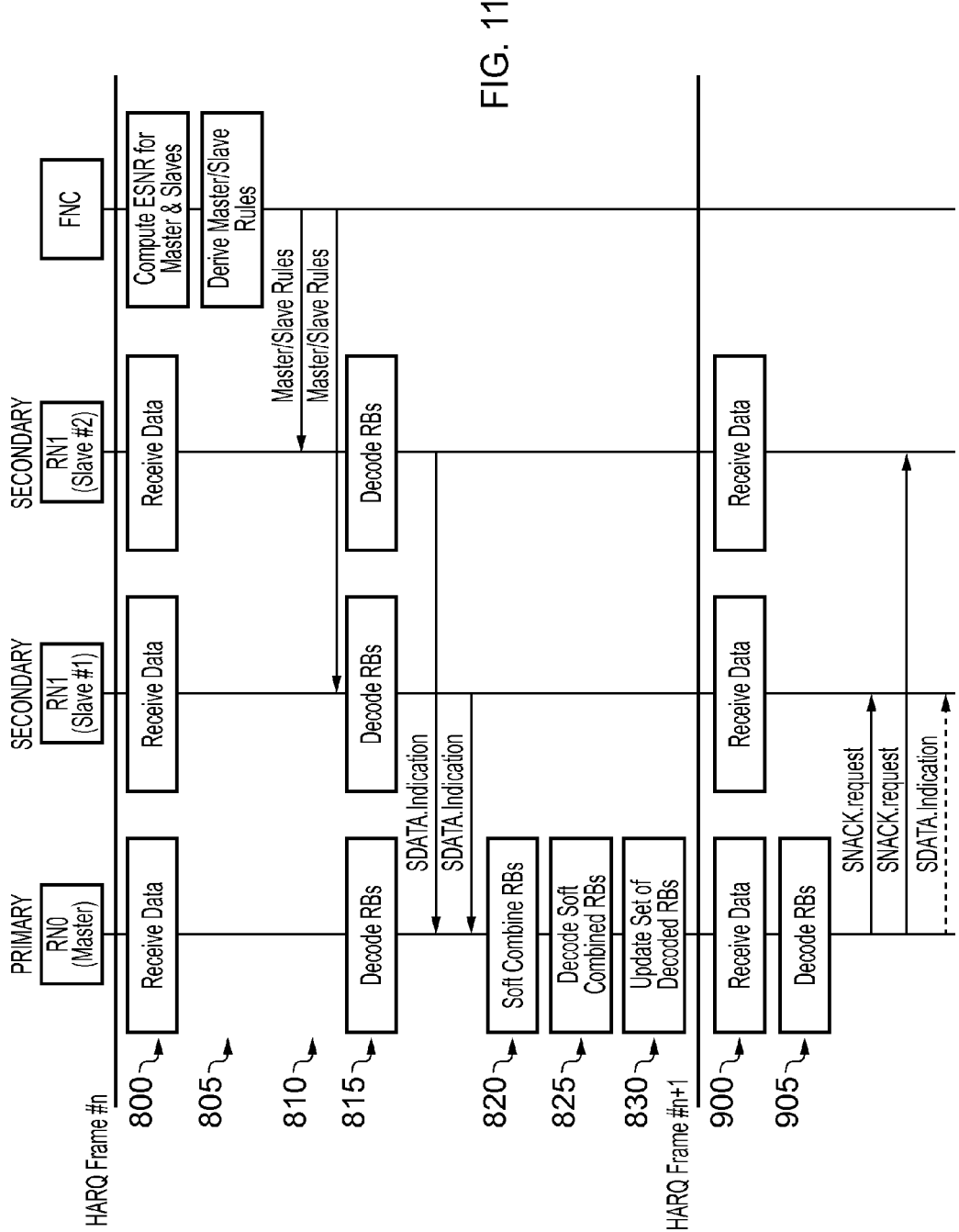
FIG. 11 schematically illustrates a sequence of operational steps and exchanged information in a feeder cluster which takes place over two phases, a first phase in which information is passed from the secondary elements to the primary element unsolicited and a second phase in which information is requested by the primary element from the secondary elements.

The embodiments discussed with reference to FIGS. 8, 9 and 10 represent different behaviours which are possible for the elements of a feeder cluster within a given HARQ frame. Accordingly, it should be understood that the elements of a feeder cluster can change their behaviour and mutual interaction from HARQ frame to HARQ frame as circumstances dictate. FIG. 11 schematically illustrates one example of this showing the interaction amongst the elements of a feeder cluster in two subsequent HARQ frames. In the first HARQ frame (steps 800 to 830) the elements of the feeder cluster behave as described with reference to the corresponding steps 600 to 630 in FIG. 9. In the subsequent HARQ frame (steps 900 to 940) the elements of this feeder cluster behave as described in FIG. 8 with reference to steps 500 to 540. The experience of the first frame interaction can inform the second frame interaction, such that for example at step 905 in the second frame when the primary element issues its SNACK.request(s) the particular requests issued (or at least the order in which they are issued) can be guided by the success (or otherwise) which resulted from the SDATA.indications received at step 815 in the previous frame. An alternative manner in which the experience of a preceding frame can inform the actions in a subsequent frame is that a SNACK.request or SDATA.request sent from the primary element to a secondary element may additionally indicate that the requested response (i.e. SNACK.response or SDATA.response respectively) should not only be sent in that frame but should continue to be transmitted in subsequent transmission frames. Alternatively, the number of frames for which such unsolicited transmissions should continue may also be specified in a request. Conversely, a primary element in receipt of such data transmissions may indicate to the secondary elements that such unsolicited transmissions should stop.

Figure 12:
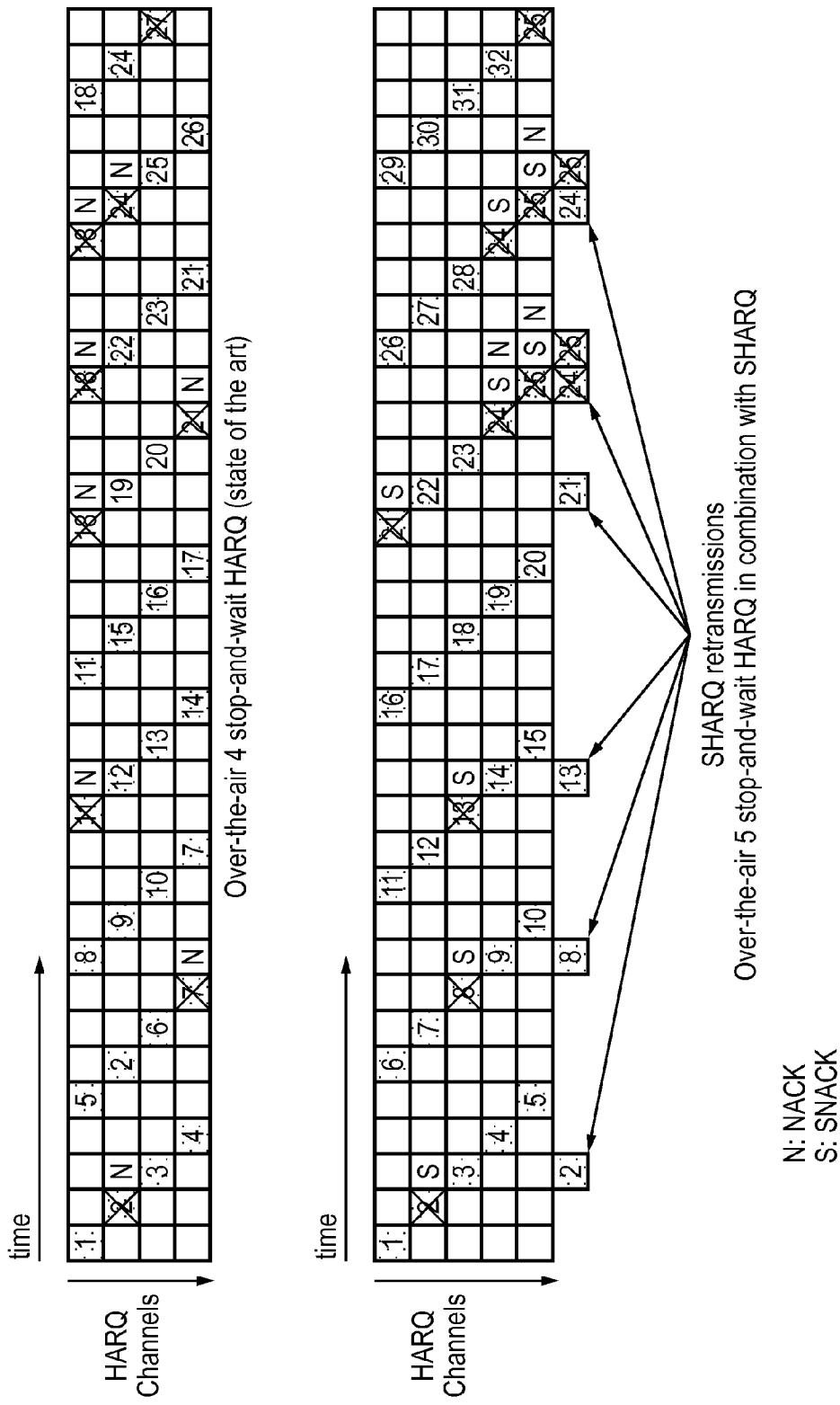
FIG. 12 schematically illustrates scheduling patterns for transmission and retransmissions in a state of the art HARQ-based system and in a system according to the present invention in one embodiment.

FIG. 12 schematically illustrates how SHARQ retransmissions (i.e. cooperative data sharing within a feeder cluster) compares to state of the art HARQ retransmissions. In the upper diagram in FIG. 12, the scheduling of a numbered sequence of data transmissions is shown, where the time access is divided into a HARQ transmission frames and the vertical axis shows the available HARQ channels. HARQ channels belonging to the same wireless FBS-FTR link are time-multiplexed onto the same radio resource elements. It can be seen that transmission #2 is unsuccessful and is hence followed by a NACK such that a retransmission of transmission #2 is scheduled at the next opportunity. The same applies to transmissions #7 and #11. Note that for transmission #18 it takes three subsequent retransmissions for this transmission to be successful. Transmissions #21 and #24 are also successful after a single retransmission attempt.

The lower diagram in FIG. 12 compares the performance of the present techniques with the state of the art HARQ technique. Data transmissions in the same time slots as those illustrated in the upper diagram take place in the lower diagram, but the numbering differs because many of the HARQ retransmissions are avoided by SHARQ cooperative information exchange retransmissions. For example, where transmission #2 fails the SNACK retransmission which follows it is resolved in the same frame and furthermore without conflicting with the concurrent transmission number 3. This is of course because the resolution of this failure to decode transmission number #2 is mediated by the additional communications resource (for example provided by a wired connection between the feeder cluster elements) and therefore does not conflict with the ongoing data transmissions via the wireless resource. Hence, when the retransmission of transmission #2 is taking place in the upper diagram, transmission #6 is already scheduled in the lower diagram. The same can be seen to occur with respect to further transmissions #8, #13 and #21 in the lower diagram which are each successfully resolved via SHARQ retransmissions and thus at each corresponding time slot the scheduling in the lower diagram becomes one slot ahead of the upper diagram.

The lower diagram further illustrates that if a SHARQ retransmission does not enable the decoding of a given transmission then a HARQ NACK acknowledgement can be used to provoke a HARQ-style retransmission of this data scheduled at the next available opportunity. Hence for example after the first attempt at transmission #24 fails and the following SHARQ retransmissions also fails, the HARQ NACK is sent to cause transmission #24 to be rescheduled. As can be seen in the lower diagram in FIG. 12 the second transmission #24 is also unsuccessful, but the second SHARQ retransmission which follows this results in successful decode. Note however that for transmission #25 an ongoing failure of both HARQ and SHARQ retransmissions is illustrated.

Figure 13:
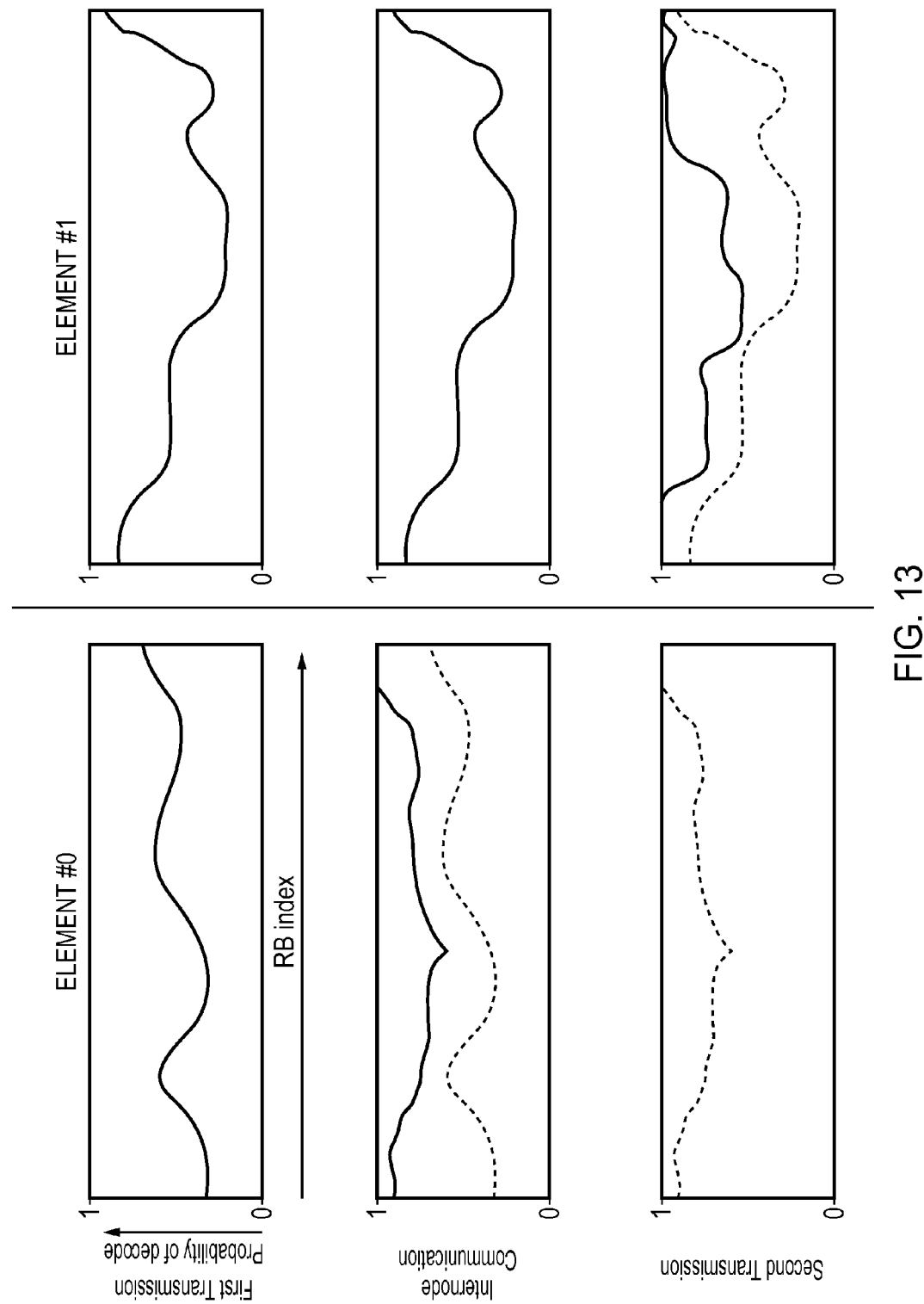
FIG. 13 schematically illustrates the improving probability of decode with respect to resource block index for a primary element receiving additional information from a secondary element in one embodiment.

FIG. 13 schematically illustrates how the probability of decode across a range of resource blocks is improved by combining data from two elements within a feeder cluster (labelled element #0 and element #1 in this example). After a first data transmission, the distributions of the probability of decode across a range of resource block indices are schematically shown for element #0 and element #1. It can be seen that each element has its own particular strengths and weaknesses with regard to the illustrated range of resource blocks. Thereafter, inter-node (i.e. inter-element) communication takes place (i.e. communication within the feeder cluster) as discussed above. In particular decoded data from element #1 is passed to element #0 resulting in an improved probability of decode across the resource block indices. Nevertheless, full probability of decode has still not been achieved and a second transmission of the data is required for element #0 to fully decode this range of resource blocks i.e. probability equal 1 across all resource block indices. The dotted lines denote the probability of decode before HARQ/SHARQ combining. The solid lines denote the probability of decode post HARQ/SHARQ combining. The determination of which wireless feeder network components to group together as feeder clusters may be performed by the feeder network controller (FNC) on the basis of information derived from an initial sounding procedure. Such an initial sounding procedure may be carried out by the feeder network controller to determine the "visibility" between wireless feeder network components. This sounding procedure comprises a systematic and exhaustive process by which each element of the wireless feeder network transmits a known sounding signal and other elements of the network which are able to receive that signal perform sounding measurements to determine their ability to receive information from that transmitting element. This process is carried out in both the uplink and the downlink direction for all elements in the wireless feeder network. The sounding procedure may be performed for all permutations within the network or may be constrained by knowledge of which elements will physically be able to receive one another's transmissions at all, for example based on geographical considerations. The sounding procedure can yield various channel metrics that include (but are not limited to): channel impulse responses, complex channel frequency responses, frequency dependent co-variance matrixes of the received signals, frequency dependent eigenmodes and so on. Building up a set of channel matrices in this manner for the whole wireless feeder network provides a system-wide view of the quality of the wireless channels in the network. Of particular interest here is the ability of a sounding procedure to inform the feeder network controller of the mutual visibility of feeder base station/feeder terminal pairs in the wireless feeder network.

Figure 14:
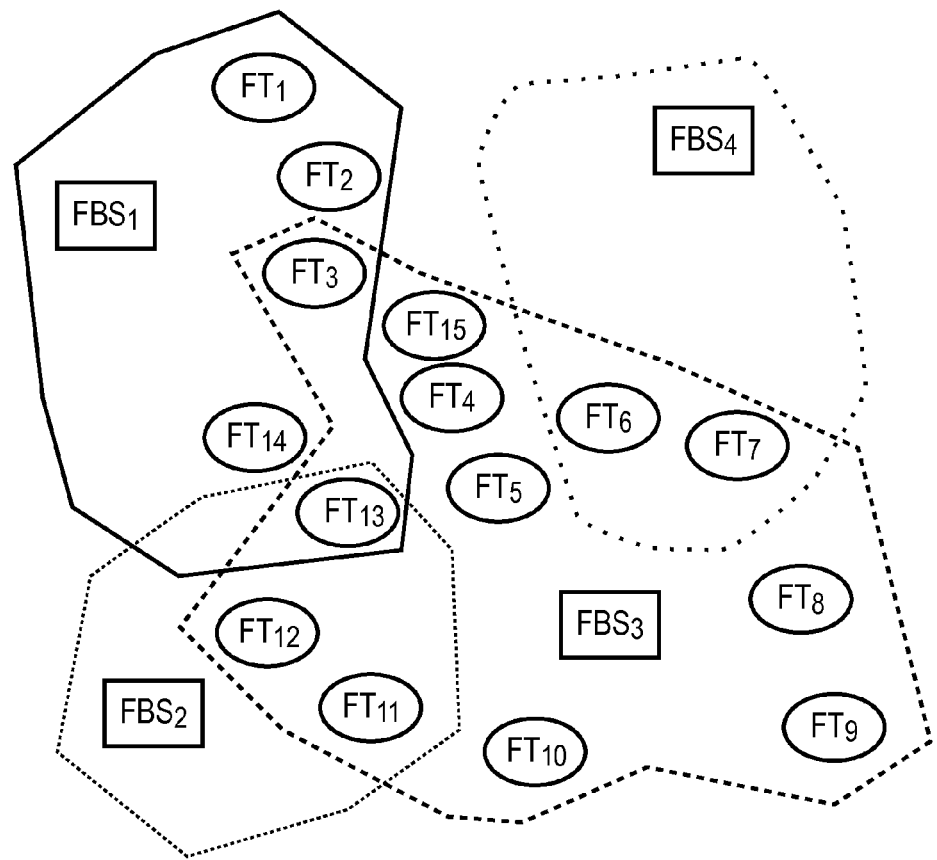
FIG. 14 schematically illustrates the determination of the mutual visibility between feeder base stations and feeder terminals resulting from a sounding procedure.

FIG. 14 schematically illustrates the outcome of one such initial sounding procedure showing (both graphically and in a matrix format) which feeder base stations and feeder terminals have visibility of one another. This visibility information can be used by the feeder network controller (or indeed the network components themselves) to determine appropriate groupings for a feeder cluster. For example $FT_{11}$, $FT_{12}$ and $FT_{13}$ may be grouped together as a feeder cluster with respect to transmissions received from $FBS_2$ since each of these feeder terminals have visibility of $FBS_2$. Accordingly, when $FT_{12}$ is seeking to decode a transmission received from $FBS_2$, information from $FT_{11}$ and $FT_{13}$ may improve its ability to perform this decode.

Figure 15:
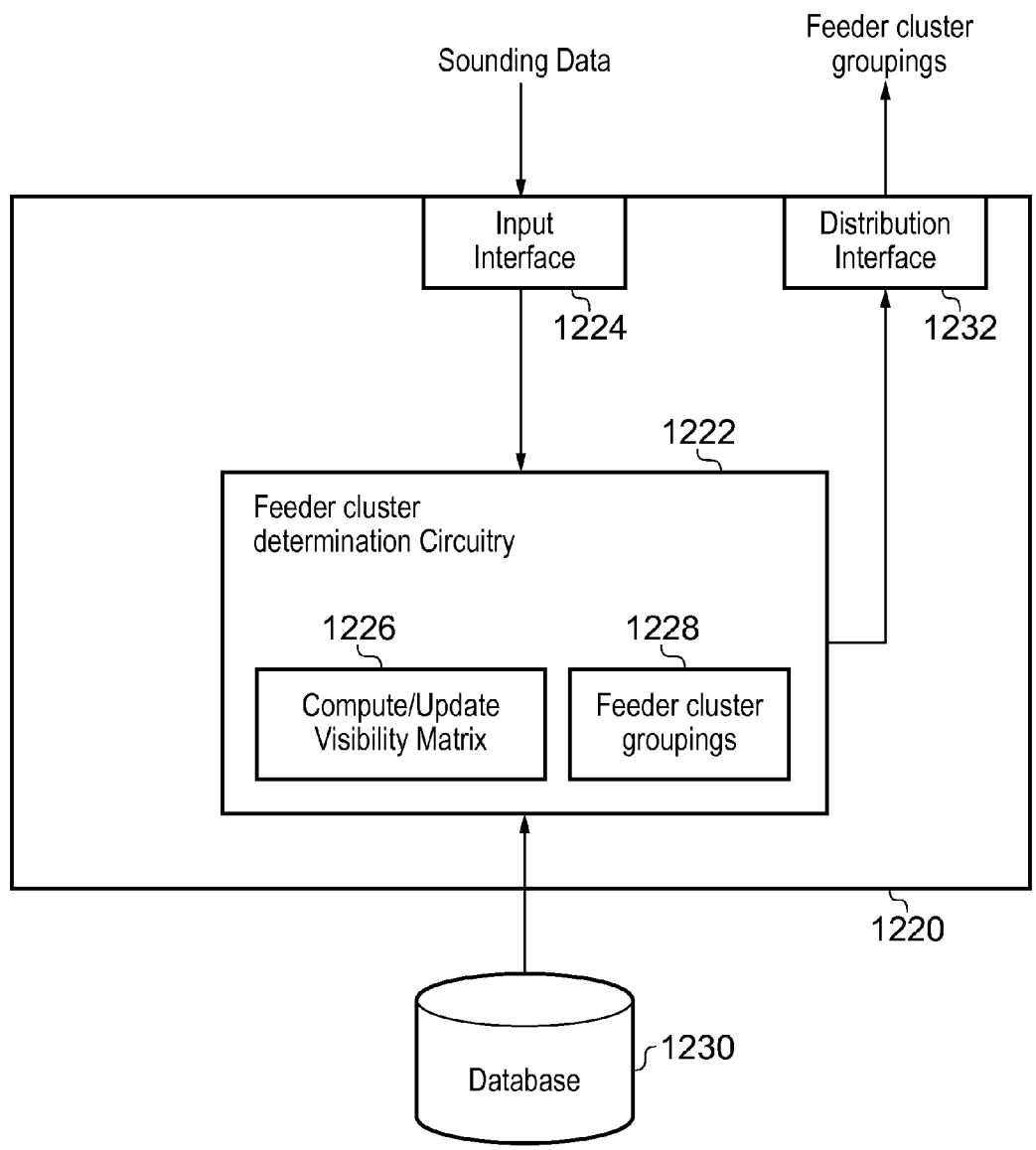
FIG. 15 schematically illustrates the configuration of a feeder network controller in one embodiment.

FIG. 15 schematically illustrates the configuration of a feeder network controller in one embodiment. Feeder network controller 1220 contains feeder cluster determination circuitry 1222 for computing and updating visibility matrices and feeder cluster groupings. Via the input interface 1224, the feeder cluster determination circuitry receives sounding data from the network which provides the information from which the visibility matrix can be determined (item 1226). The sounding data received at input 1224, together with the visibility matrix, provide the basis for determining the feeder cluster groupings (item 1228) within the feeder cluster determination circuitry 1222. The feeder cluster determination circuitry 1222 also has reference to a database 1230 wherein previously determined visibility matrices and feeder cluster groupings may be stored, as well as other configurational parameters. Once determined, the feeder cluster groupings are distributed to the network via distribution interface 1232 to configure the feeder clusters in the wireless feeder network accordingly.

Although a particular embodiment has been described herein, it will be appreciated that the invention is not limited thereto and that many modifications and additions thereto may be made within the scope of the invention. For example, various combinations of the features of the following dependent claims could be made with the features of the independent claims without departing from the scope of the present invention.

Clauses

Various aspects of the subject matter described herein are set forth for example, and without limitation, in the following numbered clauses:

1. A method of operating a wireless feeder network used to couple access base stations of an access network with a communications network, the wireless feeder network comprising a plurality of wireless feeder network components, the plurality of wireless feeder network components comprising a plurality of feeder base stations coupled to the communications network and a plurality of feeder terminals coupled to associated access base stations, each feeder terminal having a feeder link with a feeder base station, and the feeder links being established over a wireless resource comprising a plurality of resource blocks, the method comprising the steps of:

grouping a plurality of said wireless network components together as elements of a feeder cluster, said elements comprising a primary element and a secondary element;

providing connections between said elements of said feeder cluster, wherein said connections are mediated by an additional communications resource configured to be operated in parallel with said wireless resource;

in said primary element of said feeder cluster, receiving data transmitted via said wireless resource and performing a primary decoding process to seek to decode at least one resource block allocated for reception of data by said primary element and thereby generate primary decoded data;

in said secondary element of said feeder cluster, receiving said data transmitted via said wireless resource and performing a secondary decoding process to seek to decode said at least one resource block allocated for reception of data by said primary element and thereby generate secondary decoded data;

transmitting information derived from said secondary decoded data from said secondary element to said primary element via said additional communications resource; and in said primary element of said feeder cluster, performing a revised primary decoding process additionally using said information derived from said secondary decoded data received from said secondary element to decode more reliably said at least one resource block allocated for reception of data by said primary element.

2. The method of operating a wireless feeder network as set out in clause 1, wherein said additional communications resource is a wired communications resource.

3. The method of operating a wireless feeder network as set out in any preceding clause, wherein said plurality of said wireless network components grouped together as elements of said feeder cluster are feeder terminals.

4. The method of operating a wireless feeder network as set out in clause 1 or clause 2, wherein said plurality of said wireless network components grouped together as elements of said feeder cluster are feeder base stations.

5. The method of operating a wireless feeder network as set out in any preceding clause, wherein said wireless feeder network further comprises a feeder network controller, said feeder network controller configured to administer said grouping step.

6. The method of operating a wireless feeder network as set out in clause 5, wherein said feeder network controller is configured to administer said grouping step by identifying said secondary element to said primary element.

7. The method of operating a wireless feeder network as set out in clause 5, wherein said feeder network controller is configured to administer said grouping step by identifying said primary element to said secondary element.

8. The method of operating a wireless feeder network as set out in any of clauses 1-5, wherein said plurality of said wireless network components are configured to perform said grouping step by participating in a mutual discovery process via said additional communications resource.

9. The method of operating a wireless feeder network as set out in any preceding clause, wherein each element of said feeder cluster is configured to act as said primary element with respect to resource blocks allocated for reception of data by that element, and wherein each element of said feeder cluster is configured to act as said secondary element with respect to resource blocks allocated for reception of data by other elements of said feeder cluster.

10. The method of operating a wireless feeder network as set out in any preceding clause, wherein said secondary decoding process comprises a linked sequence of decoding stages and said information derived from said secondary decoded data transmitted from said secondary element to said primary element via said additional communications resource comprises decoded data from a selected decoding stage.

11. The method of operating a wireless feeder network as set out in clause 10, wherein said secondary element stores said decoded data from each stage of said linked sequence of decoding stages.

12. The method of operating a wireless feeder network as set out in clause 10, wherein said decoded data transmitted from said secondary element to said primary element via said additional communications resource is compressed by a compression process.

13. The method of operating a wireless feeder network as set out in clause 12, wherein said compression process comprises at least one of:

decimation of said decoded data; and quantisation of said decoded data.

14. The method of operating a wireless feeder network as set out in any preceding clause, comprising the further step, performed after performance of said primary decoding process, of:

transmitting a data request to said secondary element from said primary element via said additional communications resource, said secondary element transmitting said information derived from said secondary decoded data in response to said data request.

15. The method of operating a wireless feeder network as set out in clause 14, wherein said secondary element performs said secondary decoding process in response to said data request.

16. The method of operating a wireless feeder network as set out in clause 14, wherein said secondary element performs said secondary decoding process prior to receiving said data request from said primary element.

17. The method of operating a wireless feeder network as set out in clauses 14-16 when dependent on clause 10, wherein said data request specifies said selected decoding stage.

18. The method of operating a wireless feeder network as set out in any of clauses 14-17 when dependent on any of clauses 11-13, wherein said data request specifies a type and a level of said compression process.

19. The method of operating a wireless feeder network as set out in any of clauses 14-18, comprising the further step, performed after performing said revised primary decoding process if said at least one resource block allocated for reception of data by said primary element has not yet been successfully decoded, of:

transmitting a further data request to said secondary element from said primary element, said further data request requesting further information derived from said secondary decoded data.

20. The method of operating a wireless feeder network as set out in clause 19, wherein said further information derived from said secondary decoded data comprises more detailed data than requested in said data request.

21. The method of operating a wireless feeder network as set out in any of clauses 1-13, wherein said secondary element performs said secondary decoding process and transmits said information derived from said secondary decoded data to said primary element unsolicited by said primary element.

22. The method of operating a wireless feeder network as set out in clause 21, wherein said secondary element performs said secondary decoding process and transmits said information derived from said secondary decoded data to said primary element in dependence on a resource block usage schedule associated with said primary element.

23. The method of operating a wireless feeder network as set out in clause 21, wherein said secondary element selectively transmits said information derived from said secondary decoded data to said primary element in dependence on at least one predetermined rule.

24. The method of operating a wireless feeder network as set out in clause 23, when dependent on clause 13, wherein said at least one predetermined rule specifies at least one of:
  a decimation level; and
  a quantisation level.

25. The method of operating a wireless feeder network as set out in clause 23 or clause 24, wherein said at least one predetermined rule comprises at least one of:
  a signal-to-noise ratio dependency;
  a modulation and coding scheme dependency; and
  a multiple-input multiple-output mode dependency.

26. The method of operating a wireless feeder network as set out in any of clauses 23-25, wherein said at least one predetermined rule is resource block dependent.

27. The method of operating a wireless feeder network as set out in any of clauses 23-26, wherein said at least one predetermined rule is primary element dependent.

28. The method of operating a wireless feeder network as set out in any of clauses 23-27 when dependent on clause 5, wherein said feeder network controller is configured to provide said secondary element with said at least one predetermined rule.

29. The method of operating a wireless feeder network as set out in any of clauses 23-28 when dependent on clause 10, wherein said at least one predetermined rule specifies said selected decoding stage.

30. The method of operating a wireless feeder network as set out in any of clauses 23-29, wherein said secondary element selectively transmits said information derived from said secondary decoded data to said primary element in dependence on a plurality of predetermined rules, and wherein said secondary element is configured to select said decoded data for transmission to said primary element in accordance with the rule which results in a minimum size of said information derived from said secondary decoded data.

31. The method of operating a wireless feeder network as set out in any preceding clause, comprising the further steps, performed in said secondary element of said feeder cluster after performing said secondary decoding process, of:
  determining decode quality information indicative of said secondary element's ability to decode said at least one resource block; and
  transmitting said decode quality information from said secondary element to said primary element via said additional communications resource.

32. The method of operating a wireless feeder network as set out in clause 31, wherein said decode quality information comprises signal-to-noise-ratio information.

33. The method of operating a wireless feeder network as set out in clause 32, wherein said signal-to-noise-ratio information is a scalar value.

34. The method of operating a wireless feeder network as set out in clause 32, wherein said signal-to-noise-ratio information is a frequency-dependent vector of values.

35. The method of operating a wireless feeder network as set out in clause 31, wherein said decode quality information comprises an indication of decoding success.

36. The method of operating a wireless feeder network as set out in any of clauses 31-35, wherein said secondary element performs said further steps of determining and transmitting unsolicited by said primary element.

37. The method of operating a wireless feeder network as set out in clause 21 or clause 36, wherein, after receipt of unsolicited information, said primary element selectively instructs said secondary element to cease sending such unsolicited information.

38. The method of operating a wireless feeder network as set out in any of clauses 31-35, comprising the further step, performed after performance of said primary decoding process, of:
  transmitting an information request to said secondary element from said primary element via said additional communications resource,
  said secondary element performing said further steps of determining and transmitting in response to said information request.

39. The method of operating a wireless feeder network as set out in clause 38, wherein said information request specifies at least one of:
  a selected resource block;
  a modulation coding scheme;
  a MIMO mode;
  a transmission pre-coding matrix; and
  a reception pre-coding matrix.

40. The method of operating a wireless feeder network as set out in clause 38 or clause 39, wherein said information request is configured to cause said secondary element to continue performing said further steps of determining and transmitting without being requested to do so by said primary element.

41. The method of operating a wireless feeder network as set out in clause 40, wherein said information request specifies a duration for said secondary element to continue performing said further steps of determining and transmitting.

42. The method of operating a wireless feeder network as set out in any of clauses 38-41, wherein said information request further includes information derived from said primary decoding process.

43. The method of operating a wireless feeder network as set out in clause 42, wherein said information derived from said primary decoding process comprises primary element signal-to-noise-ratio information.

44. The method of operating a wireless feeder network as set out in clause 42, wherein said information derived from said primary decoding process comprises decoded data generated by said primary decoding process.

45. The method of operating a wireless feeder network as set out in any of clauses 31-44 when dependent on any of clauses 14-18, wherein said data request transmitted to said secondary element from said primary element via said additional communications resource is configured in dependence on said decode quality information received from said secondary element.

46. The method of operating a wireless feeder network as set out in clause 45, wherein said data request transmitted to said secondary element from said primary element is configured to minimise data transmission via said additional communications resource.

47. The method of operating a wireless feeder network as set out in any preceding clause, wherein said feeder cluster comprises a plurality of secondary elements.

48. The method of operating a wireless feeder network as set out in clause 47 when dependent on clause 38, comprising the further step, performed after receipt of said decode quality information, of:

transmitting a further information request from said primary element to a different secondary element in said feeder cluster, said further information request requesting further decode quality information indicative of said different secondary element's ability to decode said at least one resource block.

49. The method of operating a wireless feeder network as set out in clause 48, wherein said primary element transmits said further information request as a result of a determination that said decode quality information indicates that said secondary decoded data alone will be insufficient to enable said primary element to decode said at least one resource block.

50. The method of operating a wireless feeder network as set out in clause 48 or clause 49, wherein information requests are transmitted to said plurality of secondary elements in turn, in a ranked order of expected ability to decode said at least one resource block based on prior decoding history.

51. The method of operating a wireless feeder network as set out in clause 47, wherein each of said plurality of secondary elements:

receives said data transmitted via said wireless resource;

performs said secondary decoding process to seek to decode said at least one resource block allocated for reception of data by said primary element and thereby generates said secondary decoded data; and transmits said information derived from said secondary decoded data to said primary element via said additional communications resource.

52. The method of operating a wireless feeder network as set out in clause 47 when dependent on any of clauses 14-18, comprising the further step, performed after performing said revised primary decoding process if said at least one resource block allocated for reception of data by said primary element has not yet been successfully decoded, of:

transmitting a further data request from said primary element to a different secondary element in said feeder cluster, said further data request requesting further information derived from said secondary decoded data.

53. The method of operating a wireless feeder network as set out in clause 52, wherein data requests are transmitted to said plurality of secondary elements in turn, in a ranked order of expected ability to decode said at least one resource block based on prior decoding history.

54. The method of operating a wireless feeder network as set out in any preceding clause, wherein said revised primary decoding process comprises a chase combining process.

55. The method of operating a wireless feeder network as set out in any preceding clause, wherein said revised primary decoding process comprises an incremental redundancy process.

56. The method of operating a wireless feeder network as set out in any preceding clause, wherein, if said revised primary decoding process does not successfully decode said at least one resource block, said primary element is configured to issue a retransmission request for said data transmitted via said wireless resource using said at least one resource block.

57. The method of operating a wireless feeder network as set out in clause 56, wherein said retransmission request comprises an indication of extent of decoding achieved by said revised primary decoding process.

58. The method of operating a wireless feeder network as set out in clause 5, wherein said feeder network controller determines said elements of a feeder cluster in dependence on a sounding procedure previously carried out in said wireless feeder network.

59. The method of operating a wireless feeder network as set out in clause 58, wherein said feeder network controller determines a schedule for use of said resource blocks in dependence on results of said sounding procedure.

60. The method of operating a wireless feeder network as set out in clause 59, wherein said feeder network controller adjusts said schedule in dependence on a decoding improvement resulting from using said information derived from said secondary decoded data in said revised primary decoding process.

61. The method of operating a wireless feeder network as set out in clause 59, wherein said plurality of said wireless network components are configured to perform said grouping step with reference to said schedule.

62. A wireless feeder network controller configured to administer the method of any preceding clause.

63. A wireless feeder network configured according to the method of any of clauses 1-61.

64. A method of operating a wireless feeder network, substantially as hereinbefore described with reference to the accompanying figures.

65. A wireless feeder network, substantially as hereinbefore described with reference to the accompanying figures.

We claim:

1. A method of operating a wireless feeder network used to couple access base stations of an access network with a communications network, the wireless feeder network comprising a plurality of wireless feeder network components, the plurality of wireless feeder network components comprising a plurality of feeder base stations coupled to the communications network and a plurality of feeder terminals coupled to associated access base stations, each feeder terminal having a feeder link with a feeder base station, and the feeder links being established over a wireless resource comprising a plurality of resource blocks, the method comprising the steps of:

grouping a plurality of said wireless feeder network components together as elements of a feeder cluster, said elements comprising a primary element and a secondary element;

providing connections between said elements of said feeder cluster, wherein said connections are mediated by an additional wired communications resource configured to be operated in parallel with said wireless resource;

in said primary element of said feeder cluster, receiving data transmitted via said wireless resource and performing a primary decoding process to seek to decode at least one resource block allocated for reception of data by said primary element and thereby generate primary decoded data;

in said secondary element of said feeder cluster, receiving said data transmitted via said wireless resource and performing a secondary decoding process to seek to decode said at least one resource block allocated for reception of data by said primary element and thereby generate secondary decoded data;

transmitting information derived from said secondary decoded data from said secondary element to said primary element via said additional wired communications resource; and in said primary element of said feeder cluster, performing a revised primary decoding process additionally using said information derived from said secondary decoded data received from said secondary element to decode more reliably said at least one resource block allocated for reception of data by said primary element, wherein said secondary decoding process comprises a linked sequence of decoding stages, wherein said secondary element stores decoded data from each stage of said linked sequence of decoding stages, and said secondary decoded data comprises decoded data from a selected stage of said linked sequence of decoding stages, said selected stage comprising one of: a fast Fourier transformation stage, an equalization stage, a demodulation stage, and an error correction stage.

2. The method of operating a wireless feeder network as claimed in claim 1, wherein said decoded data from said selected stage is compressed by a compression process, wherein said compression process preferably comprises at least one of:
   decimation of said decoded data; and
   quantisation of said decoded data.

3. The method of operating a wireless feeder network as claimed in claim 1, comprising the further step, performed after performance of said primary decoding process, of:
   transmitting a data request to said secondary element from said primary element via said additional wired communications resource,
   said secondary element transmitting said information derived from said secondary decoded data in response to said data request, wherein said secondary element performs said secondary decoding process prior to receiving said data request from said primary element.

4. The method of operating a wireless feeder network as claimed in claim 3, wherein said decoded data transmitted from said secondary element to said primary element via said additional wired communications resource is compressed by a compression process, wherein said compression process preferably comprises at least one of:
   decimation of said decoded data; and
   quantisation of said decoded data,
   wherein said data request specifies said selected decoding stage, and a type and a level of said compression process.

5. The method of operating a wireless feeder network as claimed in claim 3, comprising the further step, performed after performing said revised primary decoding process if said at least one resource block allocated for reception of data by said primary element has not yet been successfully decoded, of:
   transmitting a further data request to said secondary element from said primary element, said further data request requesting further information derived from said secondary decoded data.

6. The method of operating a wireless feeder network as claimed in claim 1, wherein said secondary element performs said secondary decoding process and transmits said information derived from said secondary decoded data to said primary element unsolicited by said primary element.

7. The method of operating a wireless feeder network as claimed in claim 6, wherein said secondary element performs said secondary decoding process and transmits said information derived from said secondary decoded data to said primary element in dependence on at least one of:
   a resource block usage schedule associated with said primary element; and
   at least one predetermined rule.

8. The method of operating a wireless feeder network as claimed in claim 7, wherein said at least one predetermined rule specifies at least one of:
   a decimation level;
   a quantisation level;
   a signal-to-noise ratio dependency;
   a modulation and coding scheme dependency;
   a multiple-input multiple-output mode dependency;
   a resource block dependency;
   a primary element dependency; and
   a selected decoding stage.

9. The method of operating a wireless feeder network as claimed in claim 7, wherein said secondary element selectively transmits said information derived from said secondary decoded data to said primary element in dependence on a plurality of predetermined rules, and wherein said secondary element is configured to select said decoded data for transmission to said primary element in accordance with the rule which results in a minimum size of said information derived from said secondary decoded data.

10. The method of operating a wireless feeder network as claimed in claim 1, comprising the further steps, performed in said secondary element of said feeder cluster after performing said secondary decoding process, of:
    determining decode quality information indicative of said secondary element's ability to decode said at least one resource block; and
    transmitting said decode quality information from said secondary element to said primary element via said additional wired communications resource.

11. The method of operating a wireless feeder network as claimed in claim 10, wherein said decode quality information comprises at least one of:
    signal-to-noise-ratio information; and
    an indication of decoding success.

12. The method of operating a wireless feeder network as claimed in claim 10, comprising the further step, performed after performance of said primary decoding process, of:
    transmitting an information request to said secondary element from said primary element via said additional wired communications resource,
    said secondary element performing said further steps of determining and transmitting in response to said information request.

13. The method of operating a wireless feeder network as claimed in claim 12, wherein said information request specifies at least one of:
    a selected resource block;
    a modulation coding scheme;
    a MIMO mode;
    a transmission pre-coding matrix; and
    a reception pre-coding matrix.

14. The method of operating a wireless feeder network as claimed in claim 12, wherein said information request is configured to cause said secondary element to continue performing said further steps of determining and transmitting without being requested to do so by said primary element.

15. The method of operating a wireless feeder network as claimed in claim 12, wherein said information request further includes information derived from said primary decoding process.

16. The method of operating a wireless feeder network as claimed in claim 10, comprising the further step, performed after performance of said primary decoding process, of:
    transmitting a data request to said secondary element from said primary element via said additional wired communications resource,
    said secondary element transmitting said information derived from said secondary decoded data in response to said data request, wherein said secondary element performs said secondary decoding process prior to receiving said data request from said primary element,
    wherein said data request transmitted to said secondary element from said primary element via said additional wired communications resource is configured in dependence on said decode quality information received from said secondary element.

17. The method of operating a wireless feeder network as claimed in claim 16, wherein said data request transmitted to said secondary element from said primary element is configured to minimise data transmission via said additional wired communications resource.

18. The method of operating a wireless feeder network as claimed in claim 10, wherein said feeder cluster comprises a plurality of secondary elements, and comprising the further step, performed after receipt of said decode quality information, of:
    transmitting a further information request from said primary element to a different secondary element in said feeder cluster, said further information request requesting further decode quality information indicative of said different secondary element's ability to decode said at least one resource block.

19. The method of operating a wireless feeder network as claimed in claim 18, wherein said primary element transmits said further information request as a result of a determination that said decode quality information indicates that said secondary decoded data alone will be insufficient to enable said primary element to decode said at least one resource block.

20. The method of operating a wireless feeder network as claimed in claim 18, wherein each of said plurality of secondary elements:
    receives said data transmitted via said wireless resource;
    performs said secondary decoding process to seek to decode said at least one resource block allocated for reception of data by said primary element and thereby generates said secondary decoded data; and
    transmits said information derived from said secondary decoded data to said primary element via said additional wired communications resource.

21. The method of operating a wireless feeder network as claimed in claim 18, comprising the further steps, performed after performance of said primary decoding process, of:
    transmitting a data request to said secondary element from said primary element via said additional wired communications resource,
    said secondary element transmitting said information derived from said secondary decoded data in response to said data request, wherein said secondary element performs said secondary decoding process prior to receiving said data request from said primary element; and
    after performing said revised primary decoding process, if said at least one resource block allocated for reception of data by said primary element has not yet been successfully decoded,
    transmitting a further data request from said primary element to a different secondary element in said feeder cluster, said further data request requesting further information derived from said secondary decoded data.

22. The method of operating a wireless feeder network as claimed in claim 18, wherein information requests and/or data requests are transmitted to said plurality of secondary elements in turn, in a ranked order of expected ability to decode said at least one resource block based on prior decoding history.

23. The method of operating a wireless feeder network as claimed in claim 1, wherein, if said revised primary decoding process does not successfully decode said at least one resource block, said primary element is configured to issue a retransmission request for said data transmitted via said wireless resource using said at least one resource block, wherein said retransmission request comprises an indication of extent of decoding achieved by said revised primary decoding process.

24. The method of operating a wireless feeder network as claimed in claim 1, wherein said wireless network further comprises a feeder network controller, said feeder network controller determines said elements of a feeder cluster in dependence on a sounding procedure previously carried out in said wireless feeder network.

25. The method of operating a wireless feeder network as claimed in claim 24, wherein said feeder network controller determines a schedule for use of said resource blocks in dependence on results of said sounding procedure.

26. The method of operating a wireless feeder network as claimed in claim 25, wherein said feeder network controller adjusts said schedule in dependence on a decoding improvement resulting from using said information derived from said secondary decoded data in said revised primary decoding process.

27. The method of operating a wireless feeder network as claimed in claim 25, wherein said plurality of said wireless network components are configured to perform said grouping step with reference to said schedule.

28. A wireless feeder network controller configured to control a wireless feeder network used to couple access base stations of an access network with a communications network, the wireless feeder network comprising a plurality of wireless feeder network components, the plurality of wireless feeder network components comprising a plurality of feeder base stations coupled to the communications network and a plurality of feeder terminals coupled to associated access base stations, each feeder terminal having a feeder link with a feeder base station, and the feeder links being established over a wireless resource comprising a plurality of resource blocks, the wireless feeder network controller including a processor configured to:
    group a plurality of said wireless feeder network components together as elements of a feeder cluster, said elements comprising a primary element and a secondary element, wherein connections between said elements of said feeder cluster are mediated by an additional wired communications resource configured to be operated in parallel with said wireless resource;

cause said primary element of said feeder cluster to receive data transmitted via said wireless resource and to perform a primary decoding process to seek to decode at least one resource block allocated for reception of data by said primary element and thereby generate primary decoded data;

cause said secondary element of said feeder cluster to receive said data transmitted via said wireless resource and to perform a secondary decoding process to seek to decode said at least one resource block allocated for reception of data by said primary element and thereby generate secondary decoded data;

cause said secondary element to transmit information derived from said secondary decoded data from said secondary element to said primary element via said additional wired communications resource; and cause said primary element of said feeder cluster to perform a revised primary decoding process additionally using said information derived from said secondary decoded data received from said secondary element to decode more reliably said at least one resource block allocated for reception of data by said primary element, wherein said secondary decoding process comprises a linked sequence of decoding stages, wherein said secondary element stores decoded data from each stage of said linked sequence of decoding stages, and said secondary decoded data comprises decoded data from a selected stage of said linked sequence of decoding stages, said selected stage comprising one of: a fast Fourier transformation stage, an equalization stage, a demodulation stage, and an error correction stage.

29. A wireless feeder network configured to couple access base stations of an access network with a communications network, the wireless feeder network comprising a plurality of wireless feeder network components, the plurality of wireless feeder network components comprising a plurality of feeder base stations coupled to the communications network and a plurality of feeder terminals coupled to associated access base stations, each feeder terminal having a feeder link with a feeder base station, and the feeder links being established over a wireless resource comprising a plurality of resource blocks, wherein:

a plurality of said wireless feeder network components are configured to be grouped together as elements of a feeder cluster, said elements comprising a primary element and a secondary element;

said elements of said feeder cluster are configured to be interconnected by connections, wherein said connections are mediated by an additional wired communications resource configured to be operated in parallel with said wireless resource;

said primary element of said feeder cluster is configured to receive data transmitted via said wireless resource and to perform a primary decoding process to seek to decode at least one resource block allocated for reception of data by said primary element and thereby generate primary decoded data;

said secondary element of said feeder cluster is configured to receive said data transmitted via said wireless resource and to perform a secondary decoding process to seek to decode said at least one resource block allocated for reception of data by said primary element and thereby generate secondary decoded data;

said secondary element is configured to transmit information derived from said secondary decoded data from said secondary element to said primary element via said additional wired communications resource; and said primary element of said feeder cluster is configured to perform a revised primary decoding process additionally using said information derived from said secondary decoded data received from said secondary element to decode more reliably said at least one resource block allocated for reception of data by said primary element, wherein said secondary decoding process comprises a linked sequence of decoding stages, wherein said secondary element is configured to store decoded data from each stage of said linked sequence of decoding stages, and said secondary decoded data comprises decoded data from a selected stage of said linked sequence of decoding stages, said selected stage comprising one of: a fast Fourier transformation stage, an equalization stage, a demodulation stage, and an error correction stage.

* * * * *